(12) United States Patent
Kubota

(10) Patent No.: US 12,493,992 B2
(45) Date of Patent: Dec. 9, 2025

(54) ENCODING APPARATUS AND DECODING APPARATUS, AND ENCODING METHOD AND DECODING METHOD

(71) Applicant: FUJITSU LIMITED, Kawasaki (JP)

(72) Inventor: Tomonori Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 18/423,970

(22) Filed: Jan. 26, 2024

(65) Prior Publication Data

US 2025/0245858 A1    Jul. 31, 2025

Related U.S. Application Data

(63) Continuation of application No. PCT/JP2021/035013, filed on Sep. 24, 2021.

(51) Int. Cl.
*G06T 9/00* (2006.01)
*G06V 10/22* (2022.01)

(52) U.S. Cl.
CPC .............. *G06T 9/00* (2013.01); *G06V 10/22* (2022.01)

(58) Field of Classification Search
CPC ................................. G06T 9/00; G06V 10/22
USPC .................................................. 375/240.01
See application file for complete search history.

(56) References Cited

U.S. PATENT DOCUMENTS

| | | | |
|---|---|---|---|
| 2003/0112868 A1 | 6/2003 | Yan et al. | |
| 2010/0119156 A1 | 5/2010 | Noguchi et al. | |
| 2012/0128238 A1 | 5/2012 | Kameyama | |
| 2022/0284632 A1 | 9/2022 | Kubota et al. | |
| 2023/0119685 A1* | 4/2023 | Kim | H04N 19/139 |
| | | | 382/103 |

FOREIGN PATENT DOCUMENTS

| | | |
|---|---|---|
| JP | 2005-513842 | 5/2005 |
| JP | 2009-049979 | 3/2009 |

(Continued)

OTHER PUBLICATIONS

Japanese Office Action dated Apr. 22, 2025 for corresponding Japanese Patent Application No. 2023-549242, with English Translation, 11 pages.

(Continued)

*Primary Examiner* — Jeffery A Williams
(74) *Attorney, Agent, or Firm* — Fujitsu Intellectual Property Center

(57) ABSTRACT

An encoding apparatus includes: a memory; and a processor coupled to the memory and configured to: determine, based on a result of a recognition process by AI, a target region desirable for recognizing a recognition target in image data and a limit compression rate at which the recognition target is recognizable; encode all regions of the image data at the limit compression rate, and transmits the encoded image data; generate first invalidated image data by invalidating a region other than the target region in the image data, and second invalidated image data by invalidating the region other than the target region in decoding data obtained by encoding the image data at the limit compression rate, and decoding the encoded image data; and encode difference data between the first invalidated image data and the second invalidated image data at a predetermined compression rate, and transmits the encoded difference data.

7 Claims, 22 Drawing Sheets

(56) References Cited

FOREIGN PATENT DOCUMENTS

| | | |
|---|---|---|
| JP | 2011-034342 | 2/2011 |
| JP | 2011-176570 | 9/2011 |
| JP | 2013-505647 | 2/2013 |
| JP | 2021-034983 | 3/2021 |
| WO | 2011/037933 | 3/2011 |
| WO | 2021/130919 | 7/2021 |

OTHER PUBLICATIONS

Wipo, International Search Report with English Language Translation and Written Opinion and English Language Translation of Relevant Part mailed Dec. 14, 2021, in connection with PCT/JP2021/035013.

* cited by examiner

FIG. 2
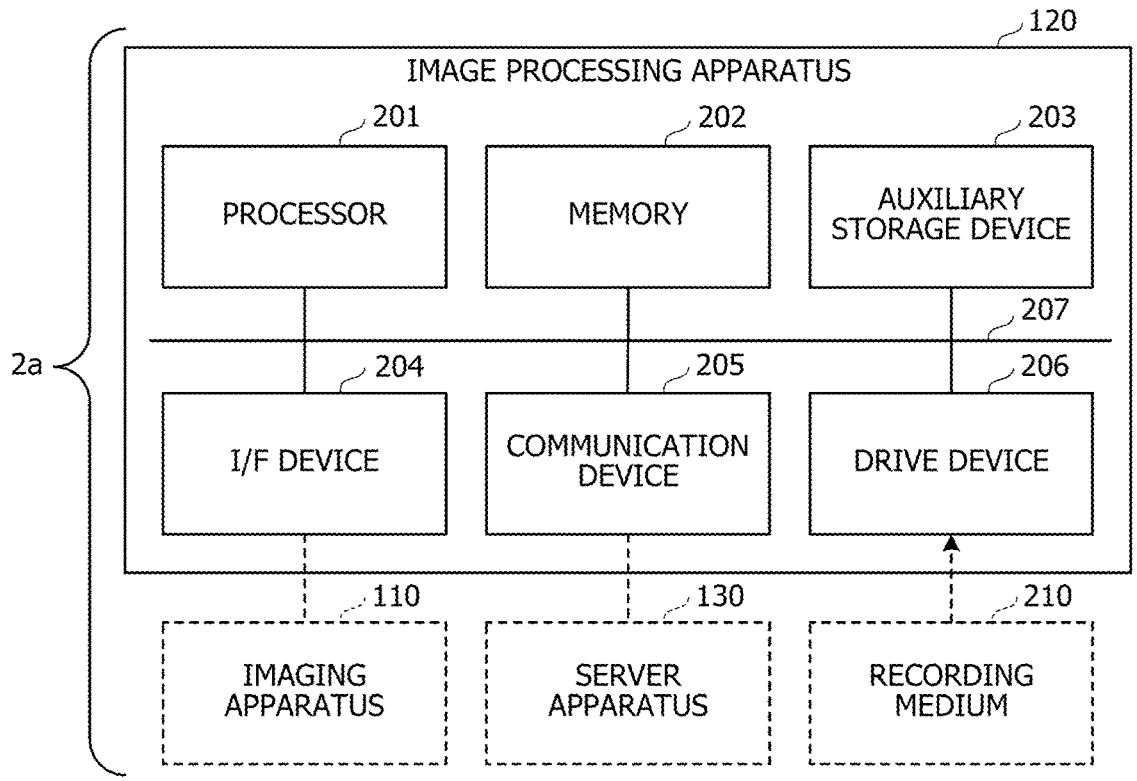
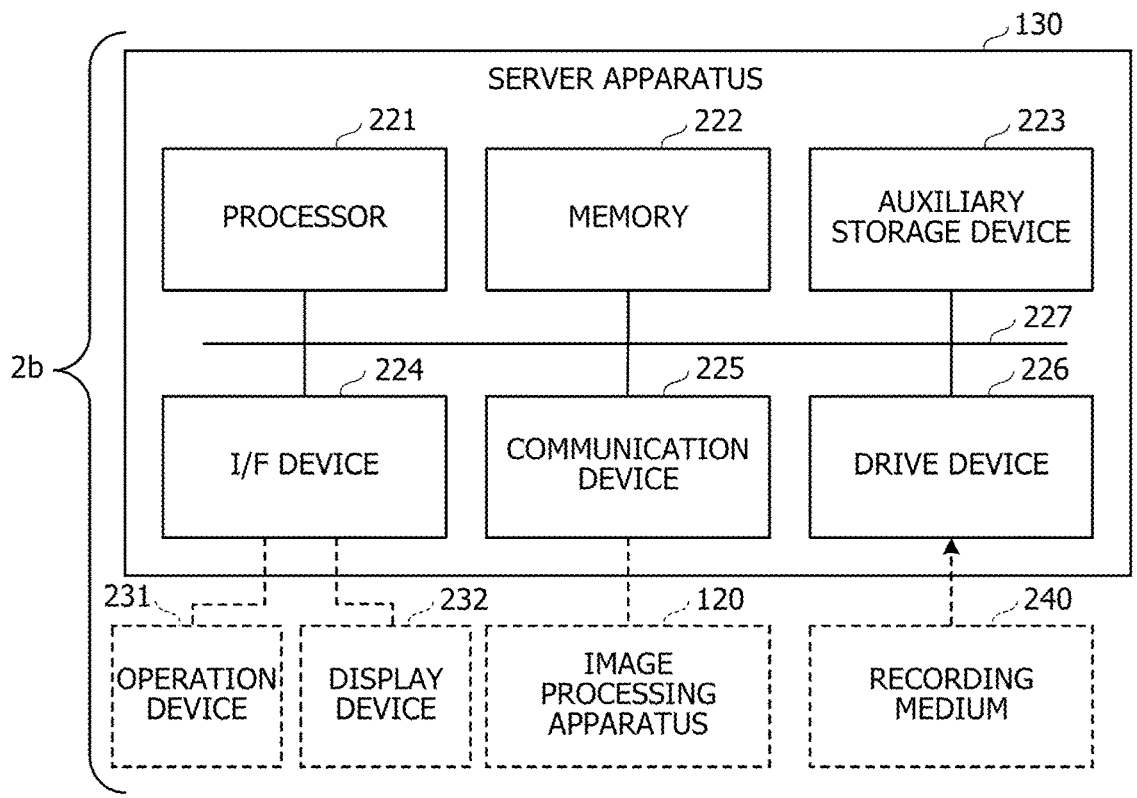

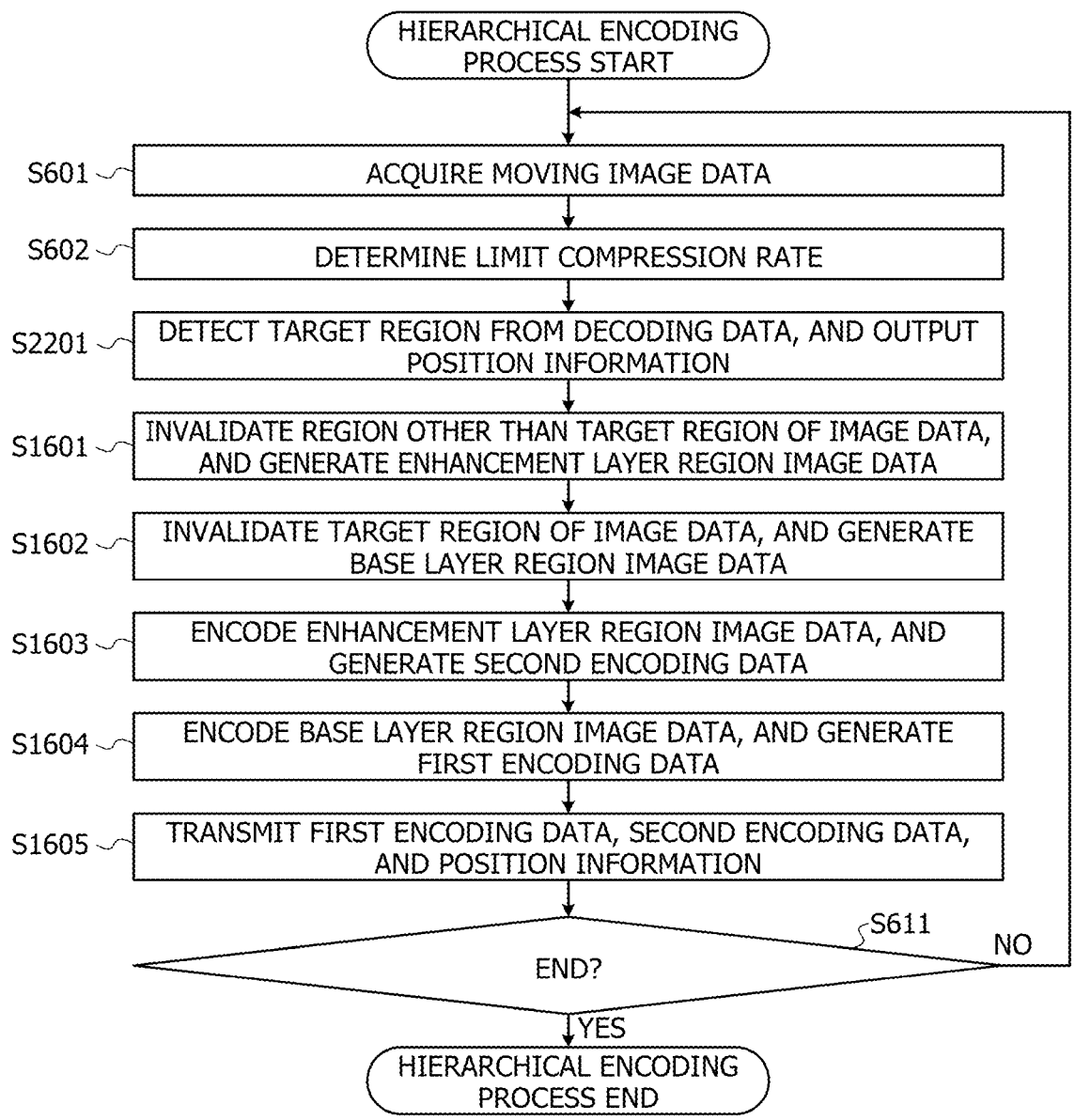

ENCODING APPARATUS AND DECODING APPARATUS, AND ENCODING METHOD AND DECODING METHOD

CROSS-REFERENCE TO RELATED APPLICATION

This application is a continuation application of International Application PCT/JP2021/035013 filed on Sep. 24, 2021 and designated the U.S., the entire contents of which are incorporated herein by reference.

FIELD

The embodiments discussed herein are related to an encoding apparatus and a decoding apparatus, an encoding method and a decoding method, and a computer-readable recording medium storing an encoding program and a computer-readable recording medium storing a decoding program.

BACKGROUND

Generally, when image data is recorded or transmitted, a recording cost or a transmission cost is reduced by reducing a data size by encoding.

Japanese Laid-open Patent Publication No. 2011-034342, and Japanese Laid-open Patent Publication No. 2021-034983 are disclosed as related art.

SUMMARY

According to an aspect of the embodiments, an encoding apparatus includes: a memory; and a processor coupled to the memory and configured to: determine, based on a result of a recognition process by AI, a target region desirable for recognizing a recognition target in image data and a limit compression rate at which the recognition target is recognizable; encode all regions of the image data at the limit compression rate, and transmits the encoded image data; generate first invalidated image data by invalidating a region other than the target region in the image data, and second invalidated image data by invalidating the region other than the target region in decoding data obtained by encoding the image data at the limit compression rate, and decoding the encoded image data; and encode difference data between the first invalidated image data and the second invalidated image data at a predetermined compression rate, and transmits the encoded difference data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a hardware configuration of an image processing apparatus and a server apparatus;

FIG. 22 is a fourth flowchart illustrating the flow of the hierarchical encoding process.

DESCRIPTION OF EMBODIMENTS

For use in a recognition process by artificial intelligence (AI), in a case where image data is recorded or transmitted, a method is conceivable in which a compression rate of each region is increased up to a limit at which the AI may recognize a recognition target (for example, at a limit compression rate) and encoding is performed with the compression rate.

Meanwhile, in a case of an encoding apparatus in which it is not possible to set a different compression rate for each region (for example, the same compression rate is set for all regions), the encoding method as described above may not be applied.

For example, a method is conceivable in which a data size of encoding data is reduced by encoding all regions at a limit compression rate while executing processing such as blackening on a region other than a target region desirable for recognizing a recognition target.

Meanwhile, in the case of such a method, since the region other than the target region in decoding data may not be used as image data, convenience of the decoding data is lowered.

According to one aspect, an object is to generate decoding data with high convenience even in a case where a different compression rate may not be set for each region.

Hereinafter, each embodiment will be described with reference to the accompanying drawings. In the present specification and drawings, components having substantially the same functional configuration will be denoted with the same reference sign, and repetitive description thereof will be omitted.

First Embodiment

<System Configuration of Image Processing System>

Figure 1:
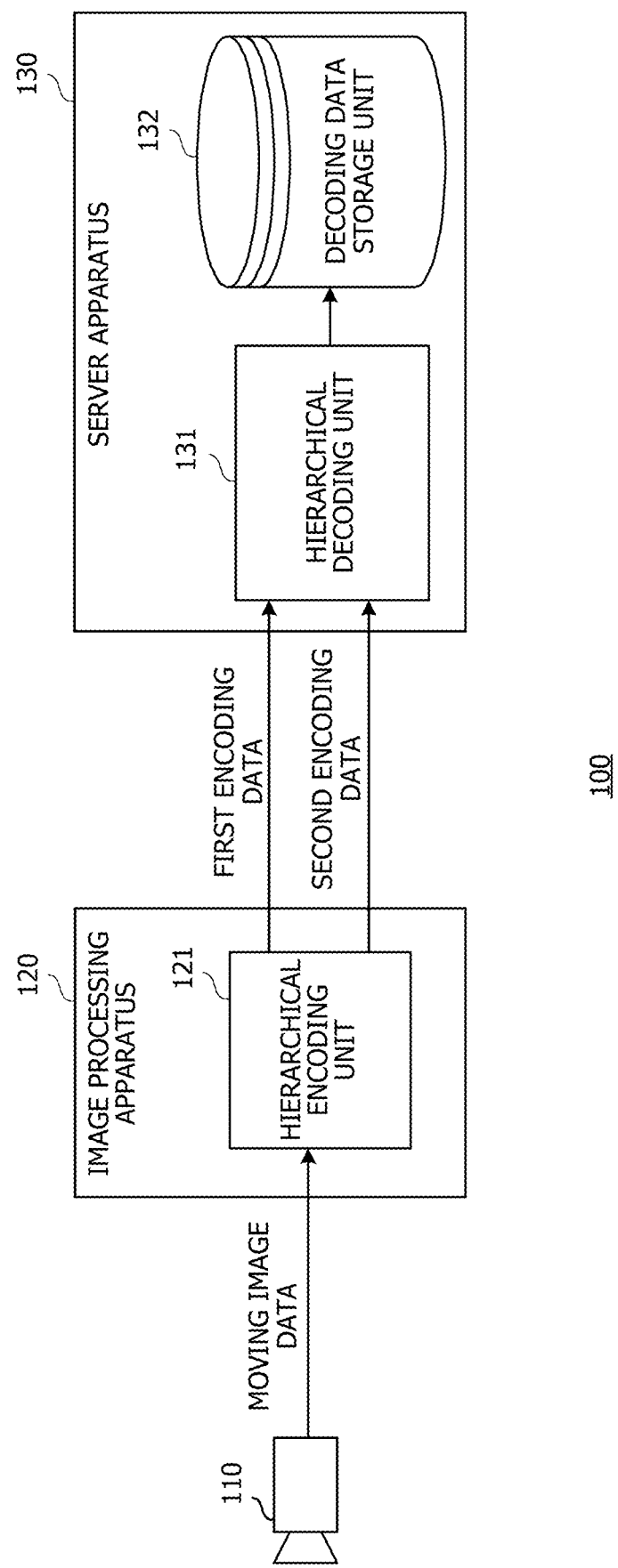
FIG. 1 is a diagram illustrating an example of a system configuration of an image processing system.

First, a system configuration of an image processing system including an encoding apparatus and a decoding apparatus will be described. FIG. 1 is a diagram illustrating an example of a system configuration of the image processing system. As illustrated in FIG. 1, an image processing system 100 includes an imaging apparatus 110, an image processing apparatus 120 that is an example of an encoding apparatus, and a server apparatus 130 that is an example of a decoding apparatus. In the image processing system 100, the image processing apparatus 120 and the server apparatus 130 are communicably coupled to each other via a network (not illustrated).

The imaging apparatus 110 performs imaging at a predetermined frame period, and transmits moving image data to the image processing apparatus 120.

An encoding program is installed in the image processing apparatus 120, and by executing the encoding program, the image processing apparatus 120 functions as a hierarchical encoding unit 121.

The hierarchical encoding unit 121 encodes image data of each frame included in the moving image data to generate first encoding data. At a time of generating the first encoding data, the hierarchical encoding unit 121 increases a compression rate up to a limit at which AI may recognize a recognition target included in the image data, and encodes all regions of the image data at the same compression rate. For example, the hierarchical encoding unit 121 encodes all the regions of the image data at a limit compression rate.

In order to compensate for a difference in image quality in a target region between decoding data in a case where the generated first encoding data is decoded and the image data before being encoded, the hierarchical encoding unit 121 encodes difference data between the two pieces of data and generates second encoding data. The target region refers to a region that is desirable for AI to recognize a recognition target in the image data.

The hierarchical encoding unit 121 transmits the generated first encoding data and second encoding data to the server apparatus 130.

A decoding program is installed in the server apparatus 130, and the server apparatus 130 functions as a hierarchical decoding unit 131 by executing the decoding program.

The hierarchical decoding unit 131 decodes the first encoding data and the second encoding data transmitted from the image processing apparatus 120 to generate first decoding data and second decoding data.

The hierarchical decoding unit 131 adds the second decoding data to the generated first decoding data, and stores the decoding data after the addition in a decoding data storage unit 132.

Therefore, in the server apparatus 130, it is possible to compensate for a deterioration in image quality of the decoding data due to the encoding at the limit compression rate for the target region. Thus, even in a case where the image processing apparatus 120 encodes the image data at the limit compression rate appropriate for a recognition process by AI, the server apparatus 130 may generate the decoding data in which the image quality of the image data before the encoding is reproduced for the target region.

With the server apparatus 130, it is possible to generate decoding data by decoding the first encoding data encoded at the limit compression rate without executing processing such as blackening. Thus, in the server apparatus 130, for example, it is possible to generate decoding data in which the image quality is improved for a region other than the target region, as compared with a case where the image data on which the processing such as blackening is performed is encoded.

As a result, with the present embodiment, it is possible to use the decoding data for applications other than the recognition process by AI. For example, with the present embodiment, even in a case where it is not possible to set a different compression rate for each region, decoding data with high convenience may be generated.

<Hardware Configuration of Image Processing Apparatus and Server Apparatus>

Next, a hardware configuration of the image processing apparatus 120 and the server apparatus 130 will be described. FIG. 2 is a diagram illustrating an example of the hardware configuration of the image processing apparatus and the server apparatus.

In FIG. 2, 2a is a diagram illustrating an example of the hardware configuration of the image processing apparatus. The image processing apparatus 120 includes a processor 201, a memory 202, an auxiliary storage device 203, an interface (I/F) device 204, a communication device 205, and a drive device 206. The respective hardware components of the image processing apparatus 120 are coupled to each other via a bus 207.

The processor 201 includes various computing devices such as a central processing unit (CPU) and a graphics processing unit (GPU). The processor 201 reads various programs (for example, an encoding program and the like) onto the memory 202 and executes the programs.

The memory 202 includes main storage devices such as a read-only memory (ROM) and a random-access memory (RAM). The processor 201 and the memory 202 form a so-called computer. As a result of the processor 201 executing the various programs read to the memory 202, the computer realizes various functions.

The auxiliary storage device 203 stores various programs and various types of data to be used in execution of the various programs by the processor 201.

The I/F device 204 is a coupling device that couples the imaging apparatus 110, which is an example of an external device, and the image processing apparatus 120.

The communication device 205 is a communication device for communicating with the server apparatus 130 via a network.

The drive device 206 is a device with which a recording medium 210 is to be set. The recording medium 210 discussed herein includes a medium that records information optically, electrically, and magnetically such as a CD-ROM, a flexible disk, and a magneto-optical disk. The recording medium 210 may also include a semiconductor memory and the like, such as a ROM or a flash memory, which records information electrically.

The various programs to be installed in the auxiliary storage device 203 are installed such that, for example, the distributed recording medium 210 is set in the drive device 206 and the drive device 206 reads the various programs recorded in the recording medium 210. Alternatively, the various programs to be installed in the auxiliary storage device 203 may be installed by being downloaded from the network via the communication device 205.

In FIG. 2, 2b illustrates an example of the hardware configuration of the server apparatus 130. Since the hardware configuration of the server apparatus 130 is approximately the same as the hardware configuration of the image processing apparatus 120, a difference from the image processing apparatus 120 will be mainly described.

For example, a processor 221 reads a decoding program or the like onto a memory 222, and executes the decoding program or the like.

An I/F device 224 receives an operation on the server apparatus 130 via an operation device 231. The I/F device 224 outputs a result of a process by the server apparatus 130, and displays the result via a display device 232. A communication device 225 communicates with the image processing apparatus 120 via a network.

<Functional Configuration of Hierarchical Encoding Unit of Image Processing Apparatus>

Figure 3:
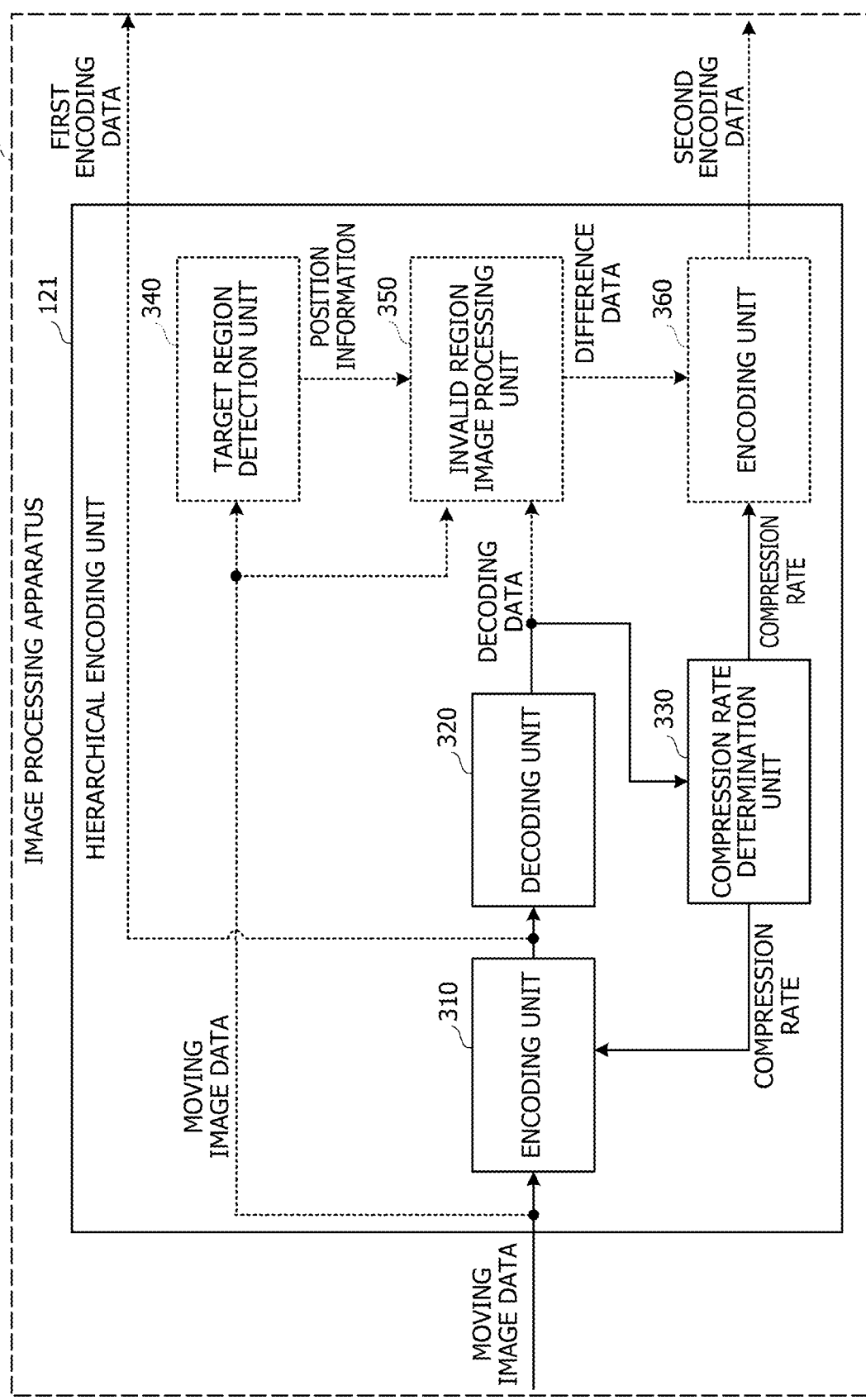
FIG. 3 is a first diagram illustrating an example of a functional configuration of a hierarchical encoding unit of the image processing apparatus.
Figure 4:
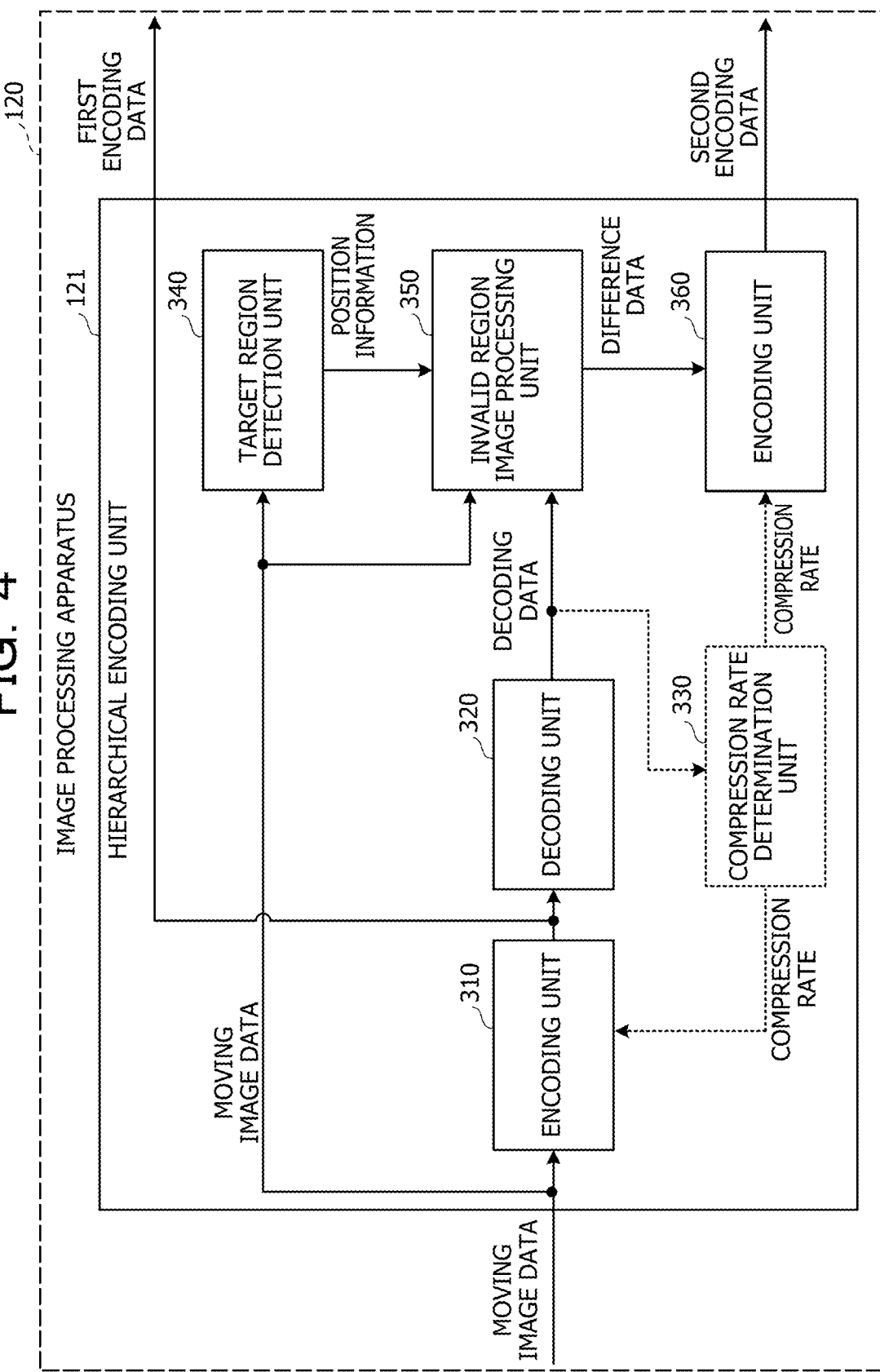
FIG. 4 is a second diagram illustrating the example of the functional configuration of the hierarchical encoding unit of the image processing apparatus.

Next, a functional configuration of the hierarchical encoding unit 121 of the image processing apparatus 120 will be described with reference to FIGS. 3 and 4. FIG. 3 and FIG. 4 are first and second diagrams illustrating an example of the functional configuration of the hierarchical encoding unit of the image processing apparatus.

Here, a function of each unit in a case where image data for one frame among pieces of image data for respective frames included in moving image data is encoded will be described separately in FIGS. 3 and 4 according to an execution order.

As illustrated in FIGS. 3 and 4, the hierarchical encoding unit 121 includes an encoding unit 310, a decoding unit 320, a compression rate determination unit 330, a target region detection unit 340, an invalid region image processing unit 350, and an encoding unit 360.

First, with reference to FIG. 3, a function of each unit until a limit compression rate to be used when image data for one frame is encoded is determined will be described.

The encoding unit 310 acquires image data for one frame from moving image data, encodes the acquired image data by using a compression rate notified by the compression rate determination unit 330, and notifies the decoding unit 320 of encoding data.

The decoding unit 320 decodes the encoding data notified by the encoding unit 310, and generates decoding data. The decoding unit 320 notifies the compression rate determination unit 330 of the generated decoding data.

The compression rate determination unit 330 is an example of a determination unit. The compression rate determination unit 330 performs a recognition process by AI on the decoding data notified by the decoding unit 320, and determines whether or not a recognition target included in the image data may be recognized. In a case where it is determined that the recognition target may be recognized, the compression rate determination unit 330 increases the compression rate by a predetermined step width and notifies the encoding unit 310 of the increased compression rate.

In a case where it is determined that the recognition target may not be recognized, the compression rate determination unit 330 determines a compression rate previously notified to the encoding unit 310 as a limit compression rate. The compression rate determination unit 330 notifies the encoding unit 310 and the encoding unit 360 of the determined limit compression rate.

In this manner, the encoding unit 310, the decoding unit 320, and the compression rate determination unit 330 determine the limit compression rate by repeating the encoding, the decoding, the recognition process, and the changing of the compression rate.

Subsequently, a function of each unit until first encoding data and second encoding data are generated by using the determined limit compression rate will be described with reference to FIG. 4.

The target region detection unit 340 is an example of a determination unit. The target region detection unit 340 performs a recognition process by AI on image data for one frame acquired from moving image data, and detects a target region desirable for recognizing a recognition target in the image data. The target region detection unit 340 calculates a position of the detected target region in the image data, and notifies the invalid region image processing unit 350 of the position information.

The invalid region image processing unit 350 is an example of a generation unit. After the encoding unit 310 encodes the image data for one frame acquired from the moving image data at the limit compression rate, in a case where the decoding unit 320 decodes the first encoding data, the invalid region image processing unit 350 acquires the decoding data.

The invalid region image processing unit 350 invalidates a region other than the target region specified by the notified position information, in the image data for one frame acquired from the moving image data, and generates first invalidated image data. The invalid region image processing unit 350 invalidates a region other than the target region specified by the notified position information in the decoding data notified by the decoding unit 320, and generates second invalidated image data. The invalid region image processing unit 350 calculates a difference between the first invalidated image data and the second invalidated image data, and generates difference data. The invalid region image processing unit 350 notifies the encoding unit 360 of the generated difference data.

The invalidation refers to changing a pixel value of each color component in a region other than the target region specified by the position information to a predetermined pixel value.

The encoding unit 310 is an example of a first encoding unit. The encoding unit 310 generates first encoding data by encoding all regions of the image data for one frame acquired from the moving image data at the determined limit compression rate. The encoding unit 310 transmits the generated first encoding data to the server apparatus 130.

The encoding unit 360 is an example of a second encoding unit. The encoding unit 360 generates second encoding data by encoding the difference data notified by the invalid region image processing unit 350 at the predetermined compression rate. The encoding unit 360 transmits the generated second encoding data to the server apparatus 130.

In this manner, the hierarchical encoding unit 121 encodes all the regions of the image data at the limit compression rate, and encodes the difference data indicating the deterioration amount of an image quality of the target region at the predetermined compression rate. Therefore, with the hierarchical encoding unit 121, it is possible to reproduce the image quality of the image data before the encoding for the target region, and it is possible to improve the image quality in the region other than the target region, as compared with the related art.

As a result, the decoding data may be used for applications other than the recognition process by AI. For example, with the hierarchical encoding unit 121, it is possible to decode the decoding data with high convenience even in a case where it is not possible to set a different compression rate for each region.

<Specific Example of Process of Invalid Region Image Processing Unit>

Figure 5:
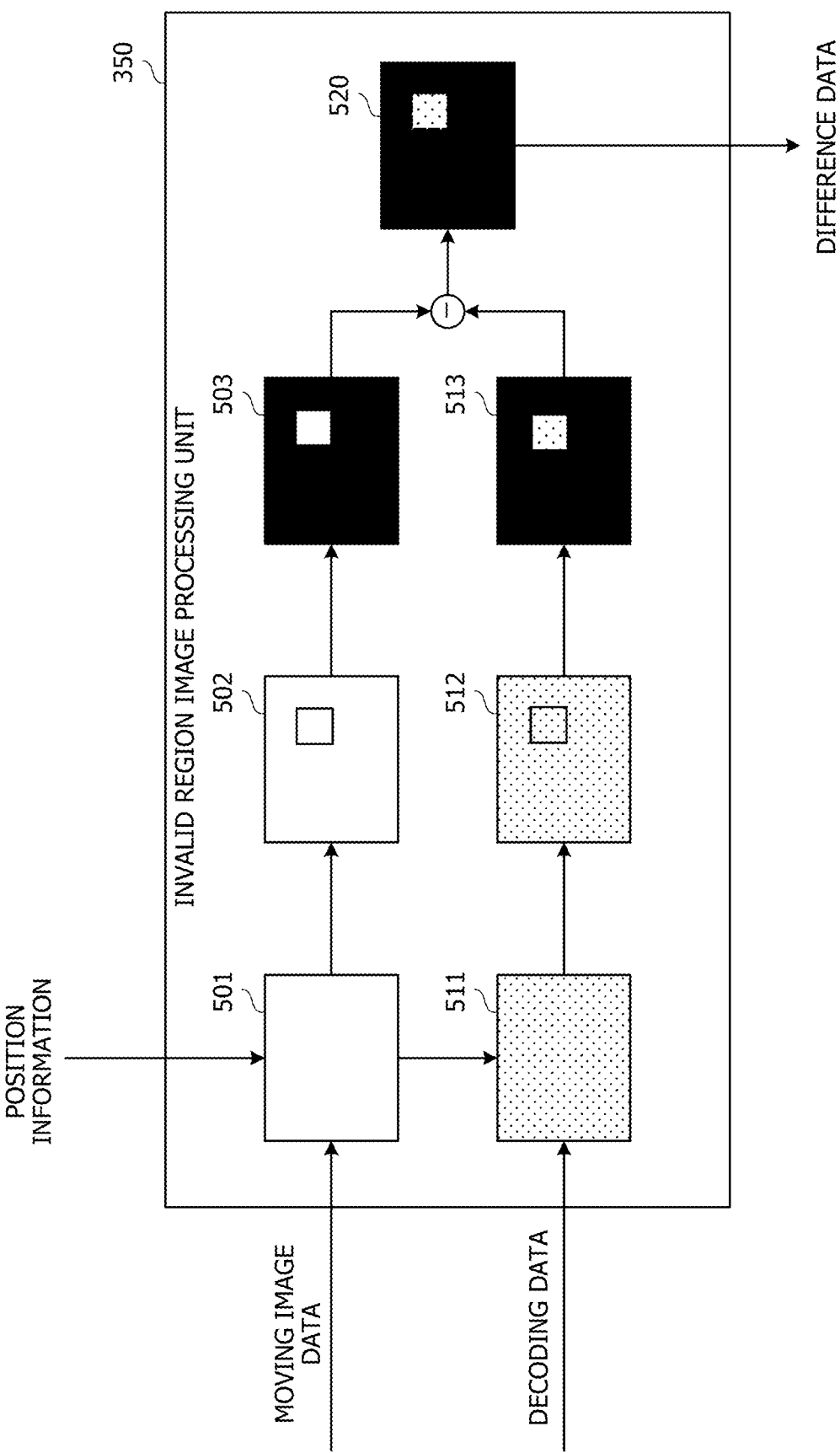
FIG. 5 is a first diagram illustrating a specific example of a process of an invalid region image processing unit.

Next, a specific example of a process of the invalid region image processing unit 350 will be described. FIG. 5 is a first diagram illustrating the specific example of the process of the invalid region image processing unit.

In FIG. 5, image data 501 is image data for one frame acquired from moving image data. As illustrated in FIG. 5, the invalid region image processing unit 350 specifies a target region in the image data 501 based on position information notified by the target region detection unit 340. Image data 502 illustrates a state in which the target region is specified. As illustrated in FIG. 5, the invalid region image processing unit 350 invalidates a region other than the target region, and generates first invalidated image data 503.

In FIG. 5, decoding data 511 is decoding data that is notified by the decoding unit 320. As illustrated in FIG. 5, the invalid region image processing unit 350 specifies a target region in the decoding data 511 based on the position information notified by the target region detection unit 340. Decoding data 512 illustrates a state in which the target region is specified. As illustrated in FIG. 5, the invalid region image processing unit 350 invalidates a region other than the target region, and generates second invalidated image data 513.

As illustrated in FIG. 5, the invalid region image processing unit 350 calculates a difference between the first invalidated image data 503 and the second invalidated image data 513, and generates difference data 520.

<Flow of Hierarchical Encoding Process>

Figure 6:
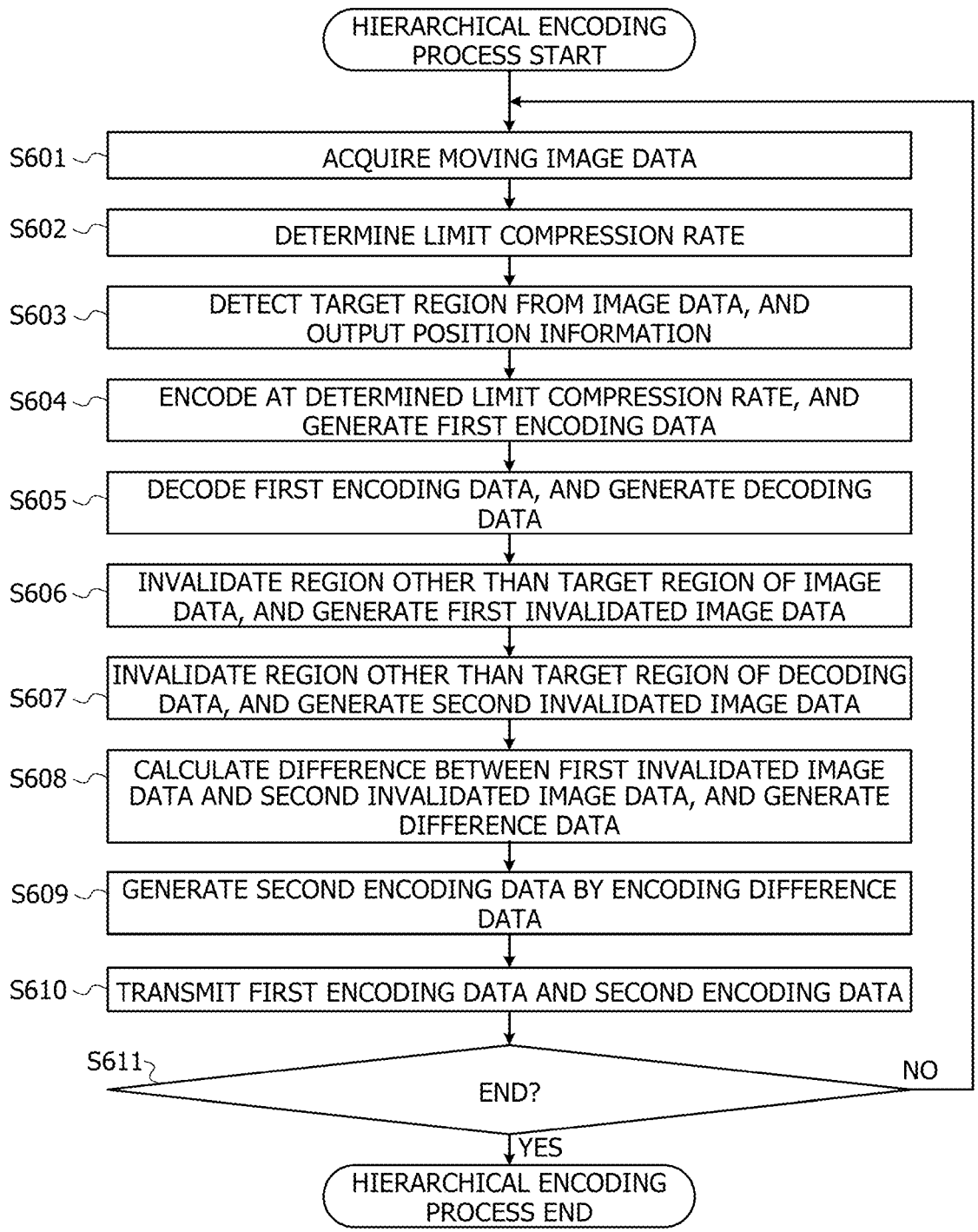
FIG. 6 is a first flowchart illustrating a flow of a hierarchical encoding process.

Next, a flow of a hierarchical encoding process by the hierarchical encoding unit 121 will be described. FIG. 6 is a first flowchart illustrating the flow of the hierarchical encoding process.

At step S601, the hierarchical encoding unit 121 acquires moving image data for each frame from the imaging apparatus 110.

At step S602, the hierarchical encoding unit 121 determines a limit compression rate for the image data for one frame acquired from moving image data.

At step S603, the hierarchical encoding unit 121 detects a target region desirable for recognizing a recognition target in the image data for one frame acquired from the moving image data, and outputs position information by calculating a position of the detected target region in the image data.

At step S604, the hierarchical encoding unit 121 encodes all regions of the image data for one frame acquired from the moving image data at the limit compression rate to generate first encoding data.

At step S605, the hierarchical encoding unit 121 decodes the generated first encoding data to generate decoding data.

At step S606, the hierarchical encoding unit 121 generates first invalidated image data by invalidating a region other than the target region specified by the position information, in the image data for one frame acquired from the moving image data.

At step S607, the hierarchical encoding unit 121 generates second invalidated image data by invalidating a region other than the target region specified by the position information in the generated decoding data.

At step S608, the hierarchical encoding unit 121 calculates a difference between the first invalidated image data and the second invalidated image data, and generates difference data.

At step S609, the hierarchical encoding unit 121 encodes the generated difference data at the predetermined compression rate to generate second encoding data.

At step S610, the hierarchical encoding unit 121 transmits the generated first encoding data and the generated second encoding data to the server apparatus 130.

At step S611, the hierarchical encoding unit 121 determines whether or not to end the hierarchical encoding process. When it is determined that the hierarchical encoding process is not to be ended (continued) in step S611 (NO in step S611), the process is returned to step S601.

Meanwhile, in a case where it is determined that the hierarchical encoding process is to be ended in step S611 (YES in step S611), the hierarchical encoding process is ended.

<Functional Configuration of Hierarchical Decoding Unit in Server Apparatus>

Figure 7:
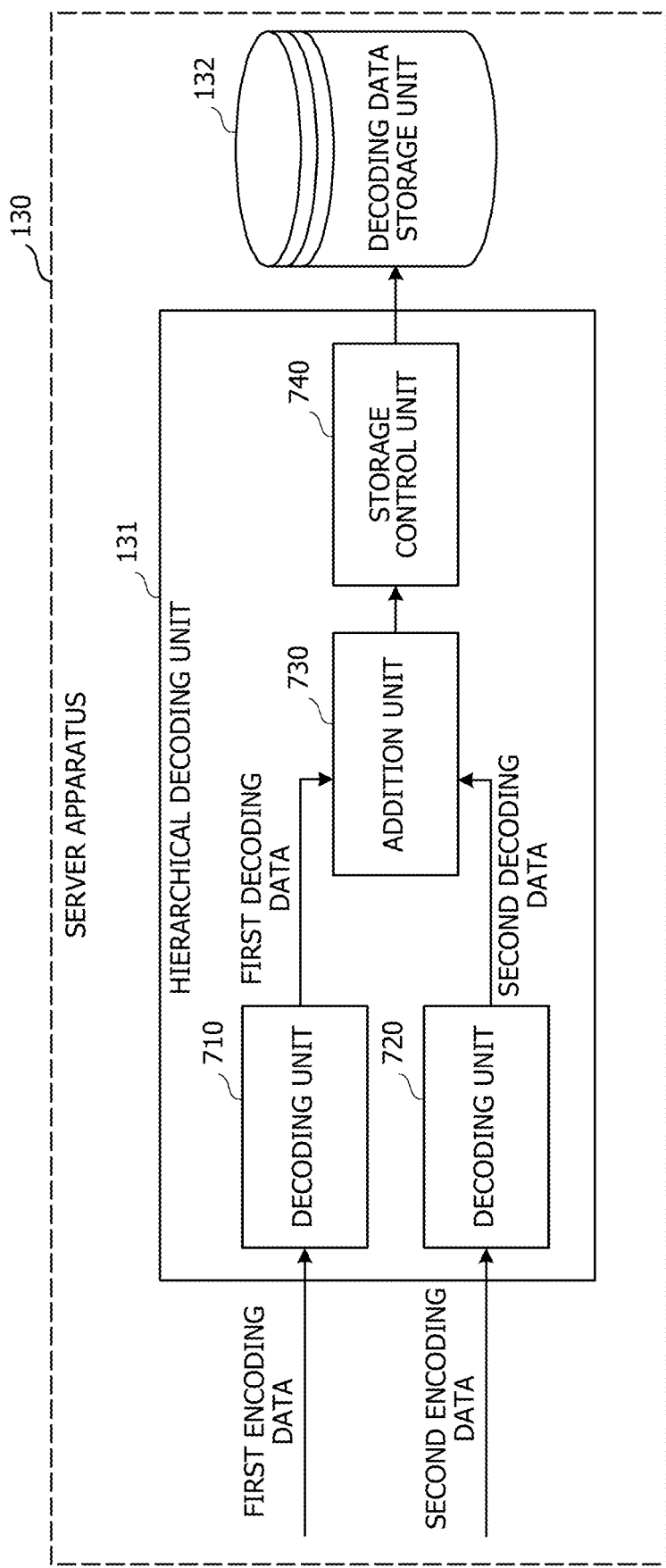
FIG. 7 is a first diagram illustrating an example of a functional configuration of a hierarchical decoding unit of the server apparatus.

Next, details of a functional configuration of the hierarchical decoding unit 131 in the server apparatus 130 will be described. FIG. 7 is a first diagram illustrating an example of the functional configuration of the hierarchical decoding unit of the server apparatus. As illustrated in FIG. 7, the hierarchical decoding unit 131 includes a decoding unit 710, a decoding unit 720, an addition unit 730, and a storage control unit 740.

The decoding unit 710 is an example of a first decoding unit. The decoding unit 710 receives first encoding data transmitted from the image processing apparatus 120. The decoding unit 710 decodes the first encoding data, and notifies the addition unit 730 of first decoding data.

The decoding unit 720 is an example of a second decoding unit. The decoding unit 720 receives second encoding data transmitted from the image processing apparatus 120. The decoding unit 720 decodes the second encoding data and, notifies the addition unit 730 of second decoding data.

The addition unit 730 adds the second decoding data notified from the decoding unit 720 to the first decoding data notified from the decoding unit 720, and generates decoding data after the addition.

The storage control unit 740 stores the generated decoding data after the addition in the decoding data storage unit 132.

In this manner, by compensating for a deterioration in image quality due to the encoding at a limit compression rate for a target region, the hierarchical decoding unit 131 may generate decoding data in which an image quality of image data before the encoding is reproduced for the target region. By decoding the first encoding data encoded at the limit compression rate without executing processing such as blackening on a region other than the target region, the hierarchical decoding unit 131 may generate decoding data having an improved image quality for the region other than the target region, as compared with the related art.

As a result, the decoding data may be used for applications other than the recognition process by AI. For example, with the hierarchical decoding unit 131, it is possible to generate decoding data with high convenience even in a case where it is not possible to set a different compression rate for each region.

<Specific Example of Process of Addition Unit>

Figure 8:
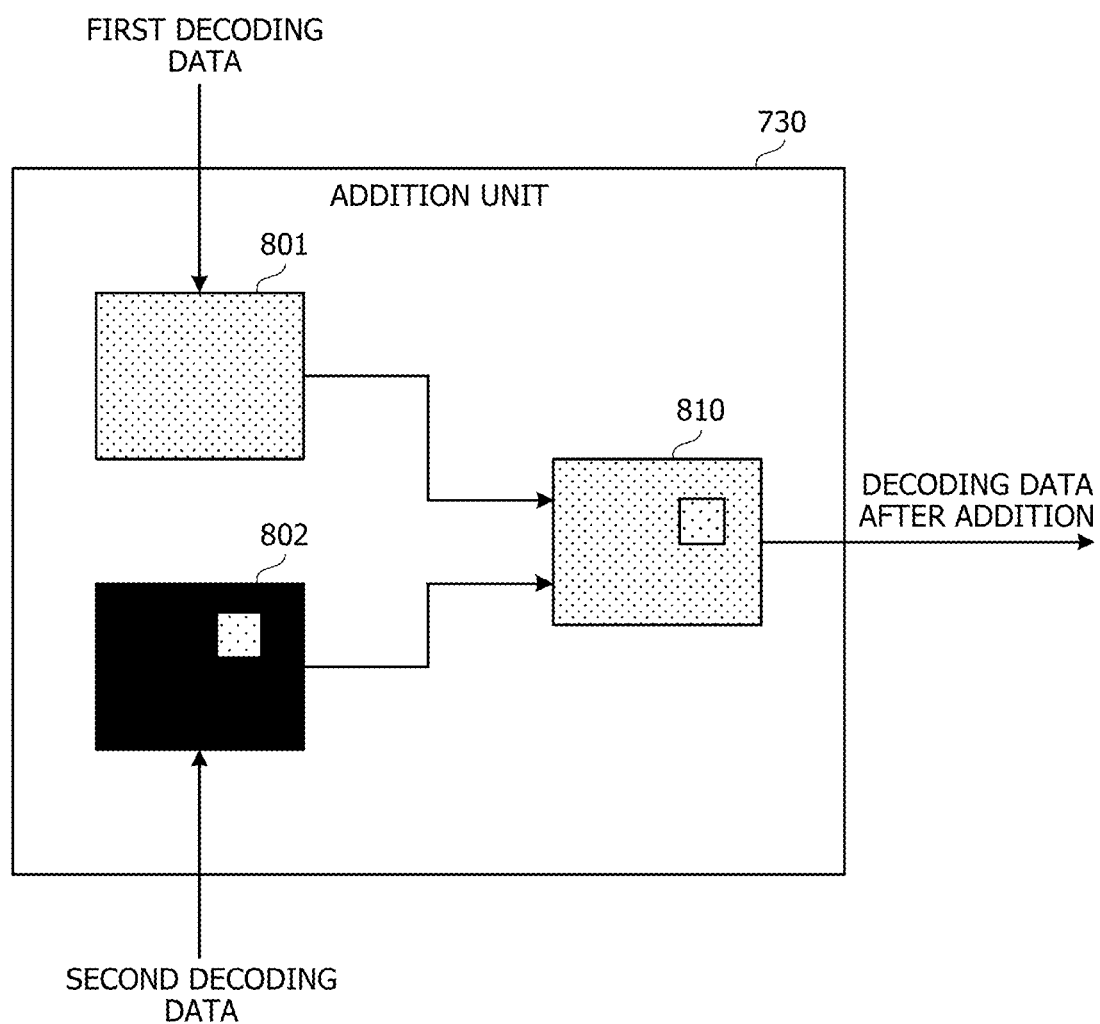
FIG. 8 is a diagram illustrating a specific example of a process of an addition unit.

Next, a specific example of a process of the addition unit 730 will be described. FIG. 8 is a diagram illustrating the specific example of the process of the addition unit. In FIG. 8, first decoding data 801 is decoding data generated by the decoding unit 710 decoding first encoding data. Second decoding data 802 is decoding data generated by the decoding unit 720 decoding second encoding data.

As illustrated in FIG. 8, the addition unit 730 adds the second decoding data 802 to the first decoding data 801 to generate decoding data 810 after the addition.

<Flow of Hierarchical Decoding Process>

Figure 9:
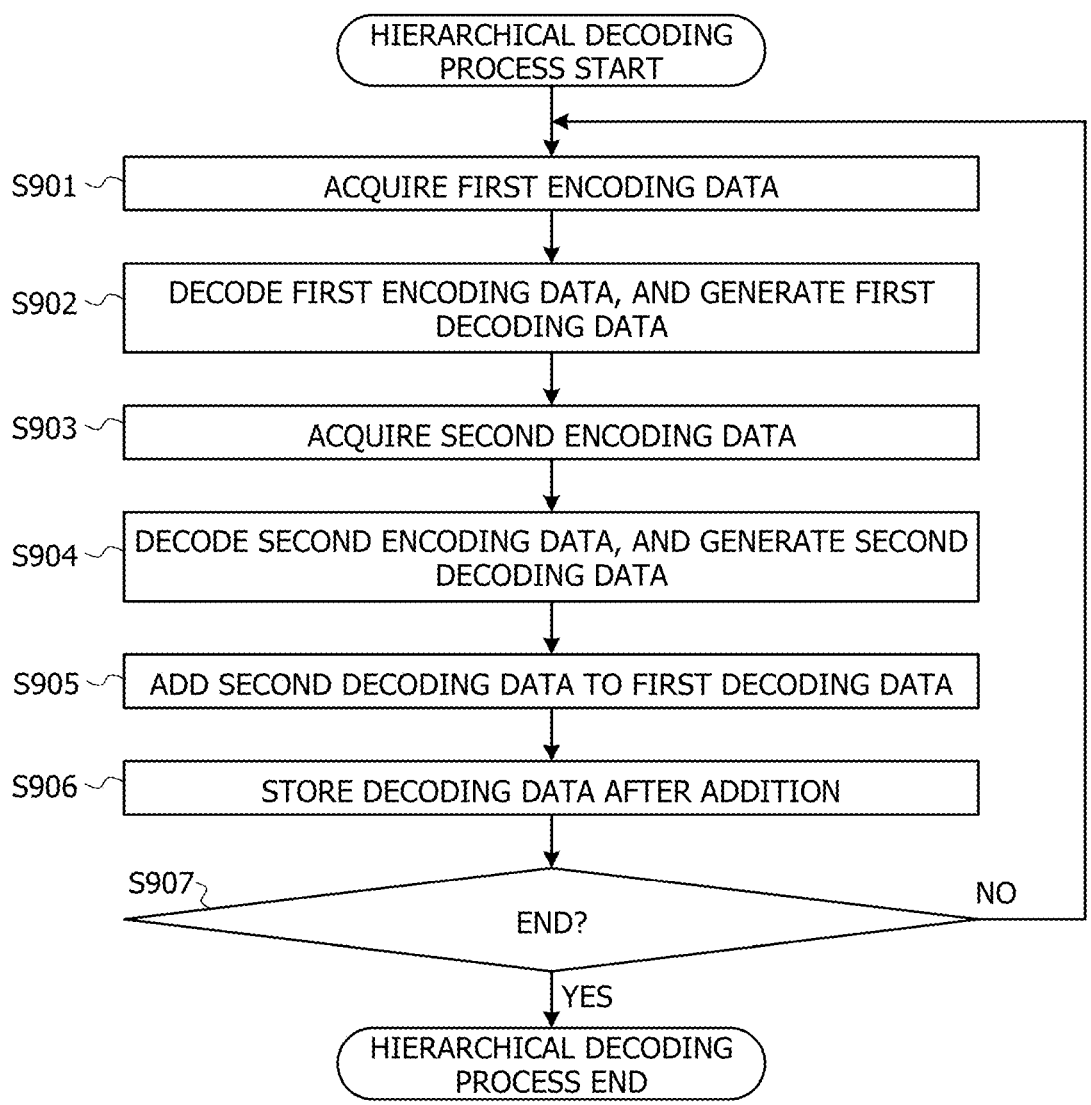
FIG. 9 is a first flowchart illustrating a flow of a hierarchical decoding process.

Next, a flow of a hierarchical decoding process by the hierarchical decoding unit 131 will be described below. FIG. 9 is a first flowchart illustrating the flow of the hierarchical decoding process.

At step S901, the hierarchical decoding unit 131 acquires first encoding data transmitted from the image processing apparatus 120.

At step S902, the hierarchical decoding unit 131 decodes the acquired first encoding data to generate first decoding data.

At step S903, the hierarchical decoding unit 131 acquires second encoding data transmitted from the image processing apparatus 120.

At step S904, the hierarchical decoding unit 131 decodes the acquired second encoding data to generate second decoding data.

At step S905, the second decoding data is added to the first decoding data.

At step S906, the hierarchical decoding unit 131 stores decoding data after the addition in the decoding data storage unit 132.

At step S907, the hierarchical decoding unit 131 determines whether or not to end the hierarchical decoding process. In a case where it is determined that the hierarchical decoding process is not to be ended (continued) in step S907 (NO in step S907), the process is returned to step S901.

Meanwhile, when it is determined that the hierarchical decoding process is to be ended in step S907 (YES in step S907), the hierarchical decoding process is ended.

As is clearly understood from the above description, the image processing apparatus 120 according to the first embodiment determines a target region desirable for recognizing a recognition target in image data and a limit compression rate at which the recognition target may be recognized. The image processing apparatus 120 according to the first embodiment encodes all regions of the image data at the determined limit compression rate, and transmits first encoding data. The image processing apparatus 120 according to the first embodiment generates first invalidated image data in which a region other than the target region in the image data is invalidated. The image processing apparatus 120 according to the first embodiment generates second invalidated image data in which a region other than the target region is invalidated in decoding data obtained by decoding image data after encoding the image data at the limit compression rate. The image processing apparatus 120 according to the first embodiment encodes difference data between the first invalidated image data and the second invalidated image data at the predetermined compression rate, and transmits second encoding data.

Therefore, with the first embodiment, the image processing apparatus 120 may reproduce an image quality of the image data before encoding in the target region, and may improve the image quality in the region other than the target region, as compared with the related art.

The server apparatus 130 according to the first embodiment generates first decoding data by decoding the first encoding data, and adds second decoding data generated by decoding the second encoding data to the generated first decoding data.

Therefore, with the first embodiment, the server apparatus 130 may generate decoding data in which the image quality of the image data before the encoding is reproduced for the target region, and may generate the decoding data having the improved image quality for the region other than the target region, as compared to the related art.

As a result, with the first embodiment, it is possible to use the decoding data for applications other than the recognition process by AI. For example, with the first embodiment, even in a case where it is not possible to set a different compression rate for each region, it is possible to generate decoding data with high convenience.

Second Embodiment

Although, in the first embodiment described above, the target region detection unit is disposed and the target region detection unit detects a region desirable for recognizing a recognition target in image data to output position information, the position information output function is not limited to being realized by the target region detection unit.

For example, when the compression rate determination unit determines a limit compression rate, the position information may be output by detecting a target region from decoding data. Hereinafter, a second embodiment will be described by focusing on a difference from the first embodiment described above.

<Functional Configuration of Hierarchical Encoding Unit of Image Processing Apparatus>

Figure 10:
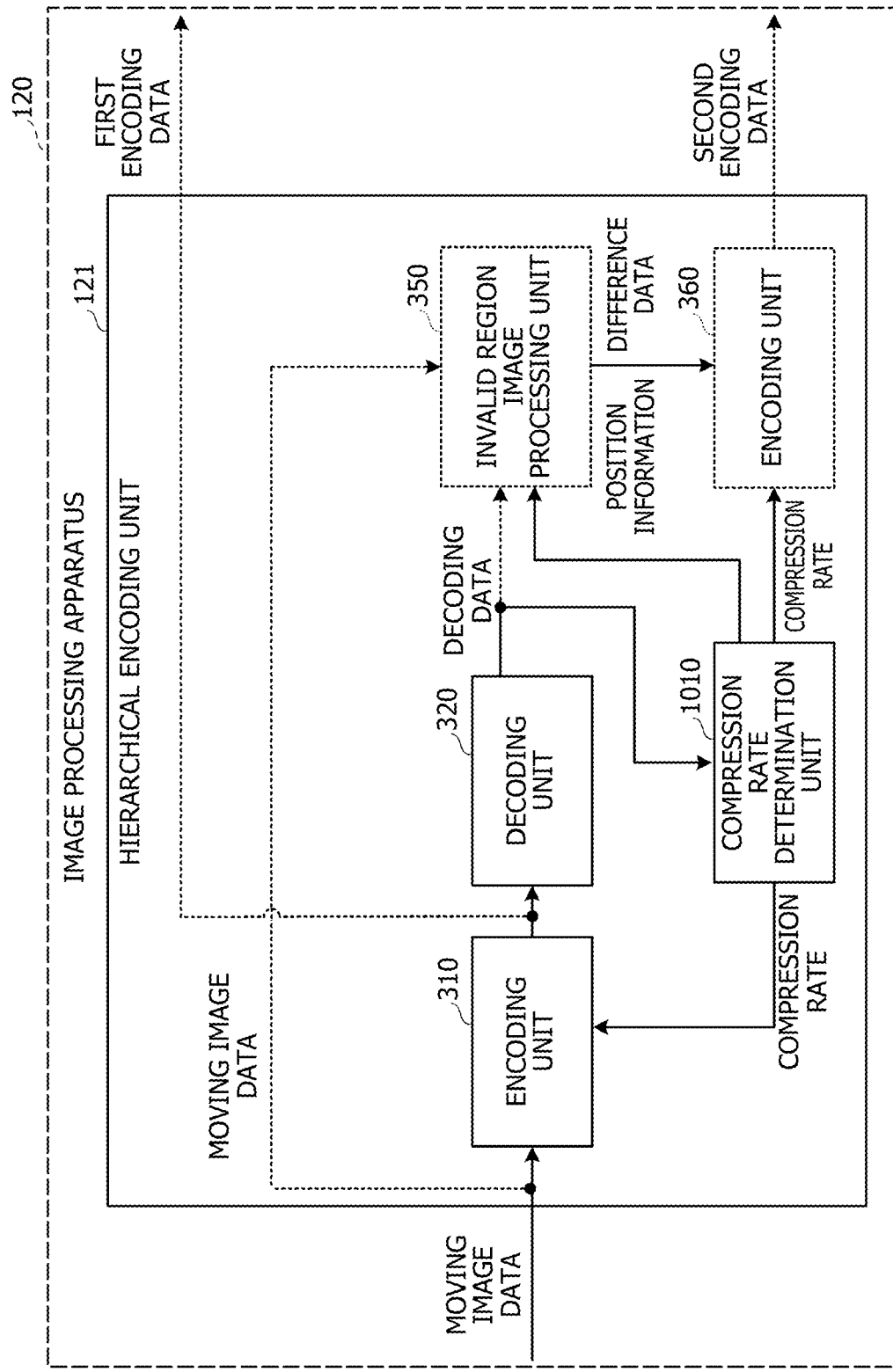
FIG. 10 is a third diagram illustrating the example of the functional configuration of the hierarchical encoding unit of the image processing apparatus.

First, a functional configuration of the hierarchical encoding unit 121 of the image processing apparatus 120 according to the second embodiment will be described. FIG. 10 is a third diagram illustrating the example of the functional configuration of the hierarchical encoding unit of the image processing apparatus. A difference from the functional configuration described with reference to FIG. 3 includes that the target region detection unit 340 is not included and that a function of a compression rate determination unit 1010 is different from the function of the compression rate determination unit 330.

The compression rate determination unit 1010 performs a recognition process by AI on decoding data notified by the decoding unit 320, and determines whether or not a recognition target included in the decoding data may be recognized. In a case where it is determined that the recognition target may be recognized, the compression rate determination unit 1010 increases a compression rate by a predetermined step width and notifies the encoding unit 310 of the increased compression rate.

In a case where it is determined that the recognition target may not be recognized, the compression rate determination unit 1010 determines the compression rate previously notified to the encoding unit 310 as a limit compression rate. The compression rate determination unit 1010 notifies the encoding unit 310 and the encoding unit 360 of the determined limit compression rate.

The compression rate determination unit 1010 detects, as a target region, a region desirable for recognizing the recognition target in the decoding data when encoding is performed at the limit compression rate. The compression rate determination unit 1010 calculates a position of the detected target region in the decoding data, and notifies the invalid region image processing unit 350 of the position information.

<Flow of Hierarchical Encoding Process>

Figure 11:
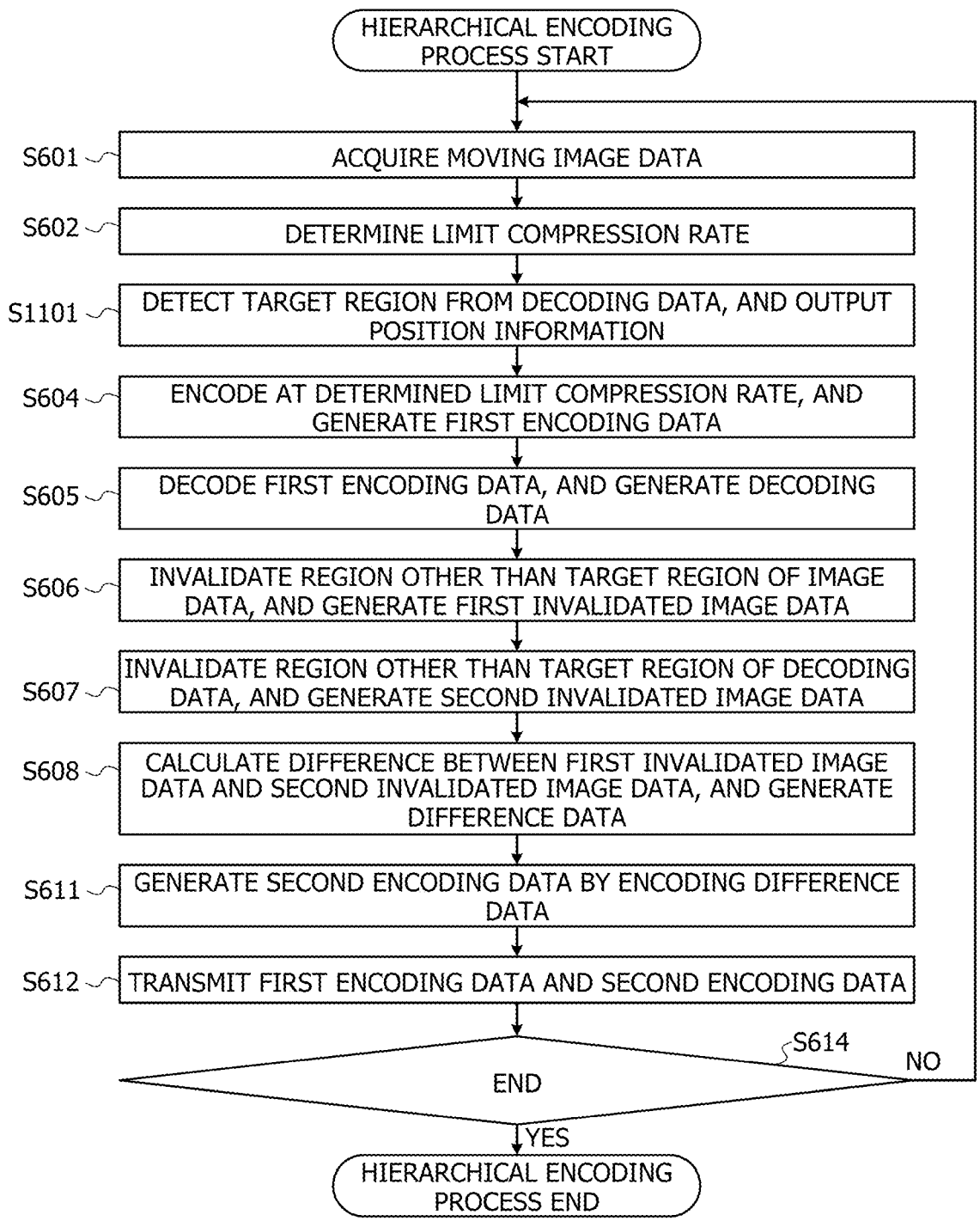
FIG. 11 is a second flowchart illustrating the flow of the hierarchical encoding process.

Next, a flow of a hierarchical encoding process by the hierarchical encoding unit 121 of the image processing apparatus 120 according to the second embodiment will be described. FIG. 11 is a second flowchart illustrating the example of the flow of the hierarchical encoding process. FIG. 11 is different from FIG. 6 in that step S1101 is provided.

At step S1101, the hierarchical encoding unit 121 detects a target region desirable for recognizing a recognition target in the decoding data when performing encoding at the limit compression rate, and outputs position information by calculating a position of the detected target region in the decoding data.

As is clearly understood from the above description, the image processing apparatus 120 according to the second embodiment outputs the position information by detecting, as the target region, the region desirable for recognizing the recognition target in the decoding data when determining the limit compression rate. Therefore, with the second embodiment, the same effects as those of the first embodiment described above may be obtained.

Third Embodiment

With the first and second embodiments described above, convenience of the decoding data is improved by compensating for a deterioration in image quality for the target region, and by encoding the region other than the target region at the limit compression rate without executing processing such as blackening.

With the first and second embodiments described above, difference data is generated from image data and encoded to compensate for a deterioration in image quality in a target region.

Meanwhile, in a third embodiment, instead of compensating for a deterioration in image quality for a target region, from image data,
  image data obtained by invalidating a region other than the target region (enhancement layer region image data), and
  image data obtained by invalidating the target region (base layer region image data)
  are generated and encoded. Therefore, in the same manner as in the first and second embodiments described above, with the third embodiment, it is possible to improve an image quality of the region other than the target region, as compared with the case where the image data on which processing such as blackening is executed is encoded. With the third embodiment, it is possible to reduce the amount of calculation desirable to decode first encoding data, as compared with the first and second embodiments described above.

Hereinafter, the third embodiment will be described by focusing on a difference from the first and second embodiments described above.

<Functional Configuration of Hierarchical Encoding Unit of Image Processing Apparatus>

Figure 12:
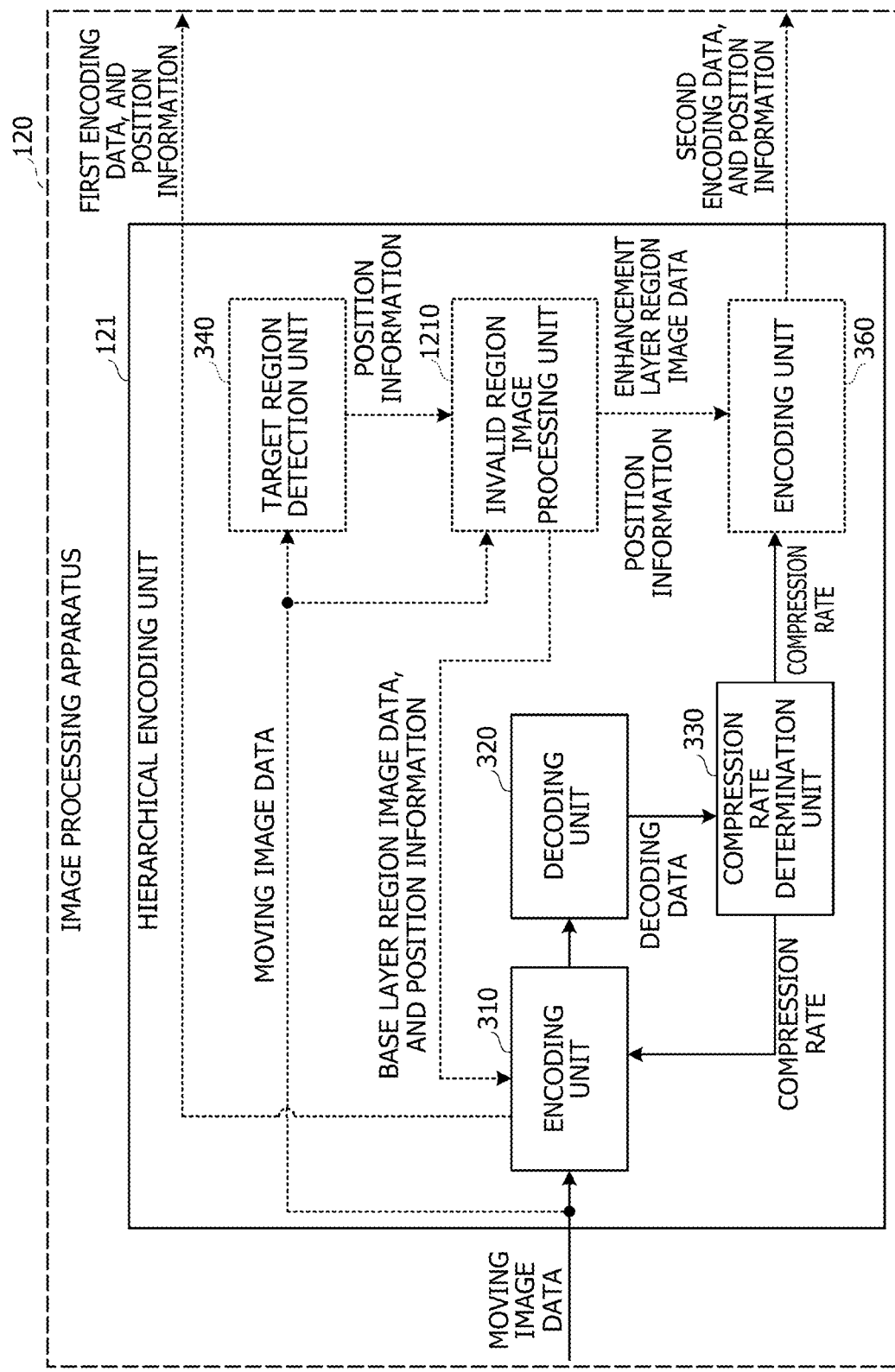
FIG. 12 is a fourth diagram illustrating the example of the functional configuration of the hierarchical encoding unit of the image processing apparatus.
Figure 13:
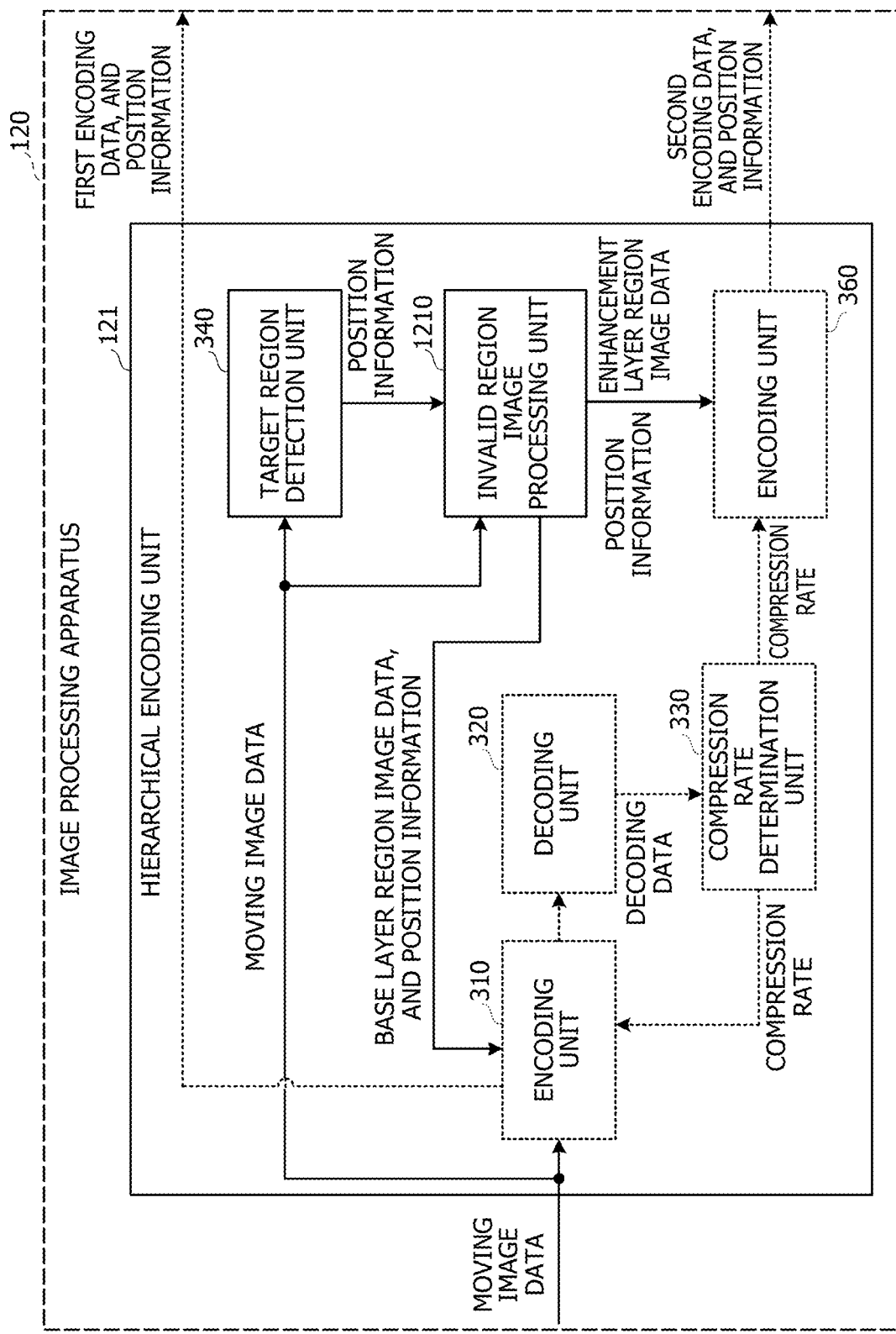
FIG. 13 is a fifth diagram illustrating the example of the functional configuration of the hierarchical encoding unit of the image processing apparatus.
Figure 14:
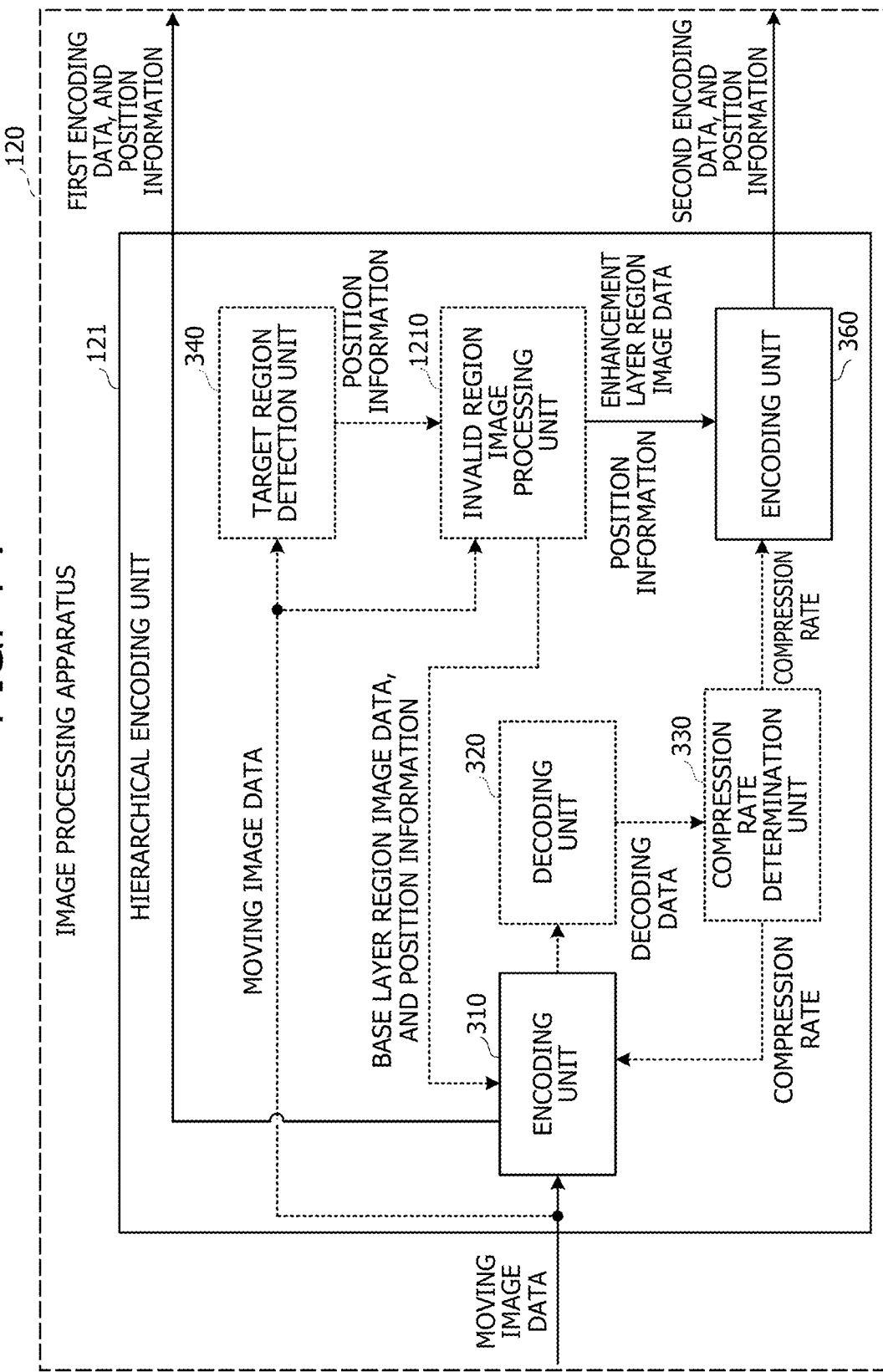
FIG. 14 is a sixth diagram illustrating the example of the functional configuration of the hierarchical encoding unit of the image processing apparatus.

First, a functional configuration of the hierarchical encoding unit 121 of the image processing apparatus 120 according to the third embodiment will be described with reference to FIGS. 12 to 14. FIG. 12 to FIG. 14 are fourth to sixth diagrams illustrating the example of the functional configuration of the hierarchical encoding unit of the image processing apparatus.

Here, a function of each unit in a case where image data for one frame among pieces of image data for respective frames included in moving image data is encoded will be described separately in FIG. 12, FIGS. 13, and 14 according to an execution order.

As illustrated in FIGS. 12 to 14, the hierarchical encoding unit 121 of the image processing apparatus 120 according to the third embodiment includes the encoding unit 310, the decoding unit 320, the compression rate determination unit 330, the target region detection unit 340, an invalid region image processing unit 1210, and the encoding unit 360.

First, with reference to FIG. 12, a function of each unit until a limit compression rate to be used when image data for one frame is encoded is determined will be described.

The encoding unit 310 acquires image data for one frame from moving image data, encodes the acquired image data by using a compression rate notified by the compression rate determination unit 330, and notifies the decoding unit 320 of encoding data.

The decoding unit 320 decodes the encoding data notified by the encoding unit 310, and generates decoding data. The decoding unit 320 notifies the compression rate determination unit 330 of the generated decoding data.

The compression rate determination unit 330 performs a recognition process by AI on the decoding data notified by the decoding unit 320, and determines whether or not a recognition target included in the image data may be recognized. In a case where it is determined that the recognition target may be recognized, the compression rate determination unit 330 increases the compression rate by a predetermined step width and notifies the encoding unit 310 of the increased compression rate.

In a case where it is determined that the recognition target may not be recognized, the compression rate determination unit 330 determines a compression rate previously notified to the encoding unit 310 as a limit compression rate. The compression rate determination unit 330 notifies the encoding unit 310 and the encoding unit 360 of the determined limit compression rate.

Subsequently, a function of each unit until image data to be encoded by each of the encoding unit 310 and the encoding unit 360 is generated will be described with reference to FIG. 13.

The target region detection unit 340 performs a recognition process by AI on image data for one frame acquired from moving image data, and detects a target region desirable for recognizing a recognition target in the image data. The target region detection unit 340 calculates a position of the detected target region in the image data, and notifies the invalid region image processing unit 1210 of the position information.

The invalid region image processing unit 1210 generates enhancement layer region image data (second invalidated image data) by invalidating a region other than the target region specified by the notified position information, in the image data for one frame acquired from the moving image data. The invalid region image processing unit 1210 notifies the encoding unit 360 of the generated enhancement layer region image data (second invalidated image data) together with position information.

The invalid region image processing unit 1210 generates base layer region image data (first invalidated image data) by invalidating the target region specified by the notified position information, in the image data for one frame acquired from the moving image data. The invalid region image processing unit 1210 notifies the encoding unit 310 of the generated base layer region image data (first invalidated image data) together with position information.

Subsequently, a function of each unit until first encoding data and second encoding data are generated will be described with reference to FIG. 14.

The encoding unit 310 transmits first encoding data generated by encoding the base layer region image data (first invalidated image data) notified by the invalid region image processing unit 1210 at a compression rate higher than a limit compression rate to the server apparatus 130 together with position information.

The encoding unit 310 transmits second encoding data generated by encoding the enhancement layer region image data (second invalidated image data) notified by the invalid region image processing unit 1210 at the limit compression rate to the server apparatus 130 together with position information.

In this manner, the hierarchical encoding unit 121 encodes the image data at the limit compression rate after the region other than the target region is invalidated, and encodes the image data at a compression rate higher than the limit compression rate after the target region is invalidated. Therefore, in the same manner as in the first and second embodiments described above, with the third embodiment, it is possible to improve an image quality of the region other than the target region, as compared with the case where the image data on which processing such as blackening is executed is encoded. With the third embodiment, it is possible to reduce the amount of calculation desirable to decode first encoding data, as compared with the first and second embodiments described above.

In the case of the third embodiment, there is an advantage that the compression rate does not have to be changed even in a case where a resolution parameter of the encoding unit 310 or the number of the target regions is increased or decreased to handle a resolution of the moving image data when the target region is encoded. In the same manner, in the case of the third embodiment, there is an advantage that the compression rate does not have to be changed even in a case where the resolution parameter of the encoding unit 310 or the number of the target regions is increased or decreased to handle the resolution of the moving image data when the region other than the target region is encoded.

<Specific Example of Process of Invalid Region Image Processing Unit>

Figure 15:
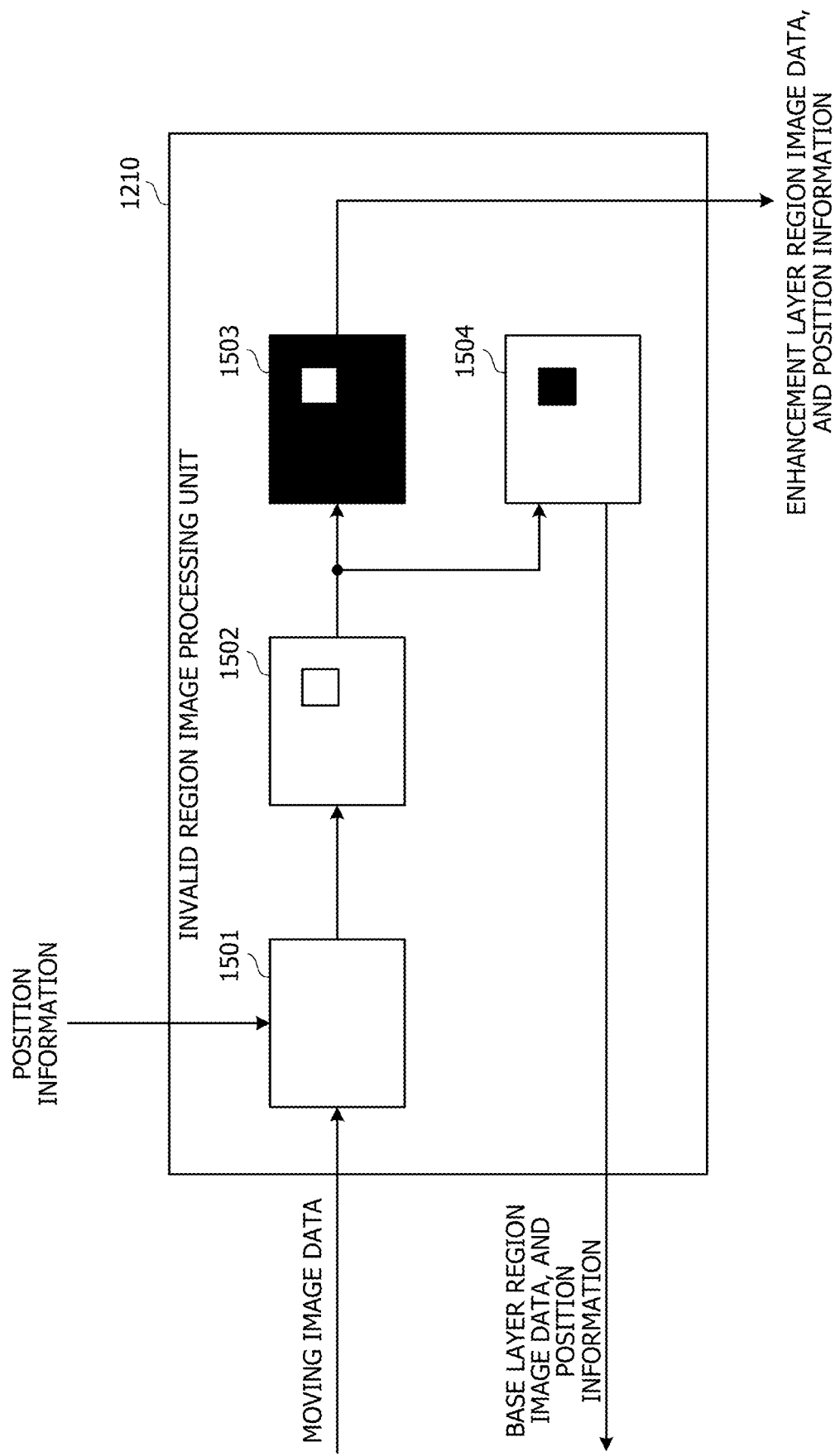
FIG. 15 is a second diagram illustrating the specific example of the process of the invalid region image processing unit.

Next, a specific example of a process of the invalid region image processing unit 1210 is described. FIG. 15 is a second diagram illustrating the specific example of the process of the invalid region image processing unit.

In FIG. 15, image data 1501 is image data for one frame acquired from moving image data. As illustrated in FIG. 15, the invalid region image processing unit 1210 specifies a target region in the image data 1501 based on position information notified by the target region detection unit 340. Image data 1502 illustrates a state in which the target region is specified.

As illustrated in FIG. 15, the invalid region image processing unit 1210 generates enhancement layer region image data 1503 (second invalidated image data) by invalidating a region other than the target region, and notifies the encoding unit 360 of the generated enhancement layer region image data 1503, together with position information.

In the same manner, the invalid region image processing unit 1210 generates base layer region image data 1504 (first invalidated image data) by invalidating the target region, and notifies the encoding unit 310 of the generated base layer region image data together with position information.

<Flow of Hierarchical Encoding Process>

Figure 16:
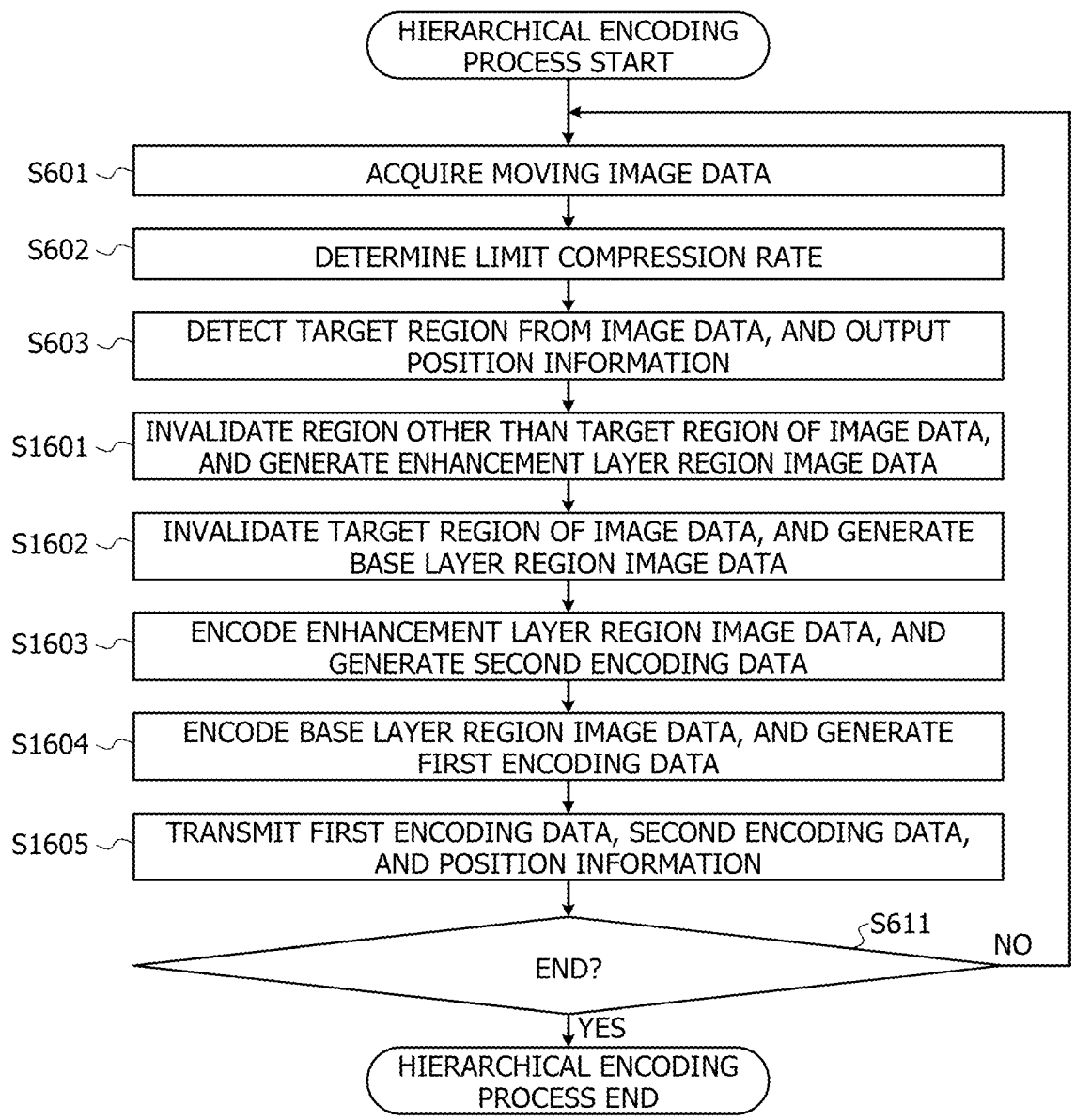
FIG. 16 is a third flowchart illustrating the flow of the hierarchical encoding process.

Next, a flow of a hierarchical encoding process by the hierarchical encoding unit 121 of the image processing apparatus 120 according to the third embodiment will be described. FIG. 16 is a third flowchart illustrating the flow of the hierarchical encoding process. FIG. 16 is different from FIG. 6 in that steps S1601 to S1605 are provided.

At step S1601, the hierarchical encoding unit 121 specifies a target region in image data for one frame acquired from moving image data based on position information, and generates enhancement layer region image data by invalidating a region other than the specified target region.

At step S1602, the hierarchical encoding unit 121 specifies the target region in the image data for one frame acquired from the moving image data based on the position information, and generates base layer region image data by invalidating the specified target region.

At step S1603, the hierarchical encoding unit 121 encodes the enhancement layer region image data at a limit compression rate to generate second encoding data.

At step S1604, the hierarchical encoding unit 121 encodes the base layer region image data at a compression rate higher than the limit compression rate to generate first encoding data.

At step S1605, the hierarchical encoding unit 121 transmits the first encoding data and the second encoding data to the server apparatus 130 in association with position information.

<Functional Configuration of Hierarchical Decoding Unit in Server Apparatus>

Figure 17:
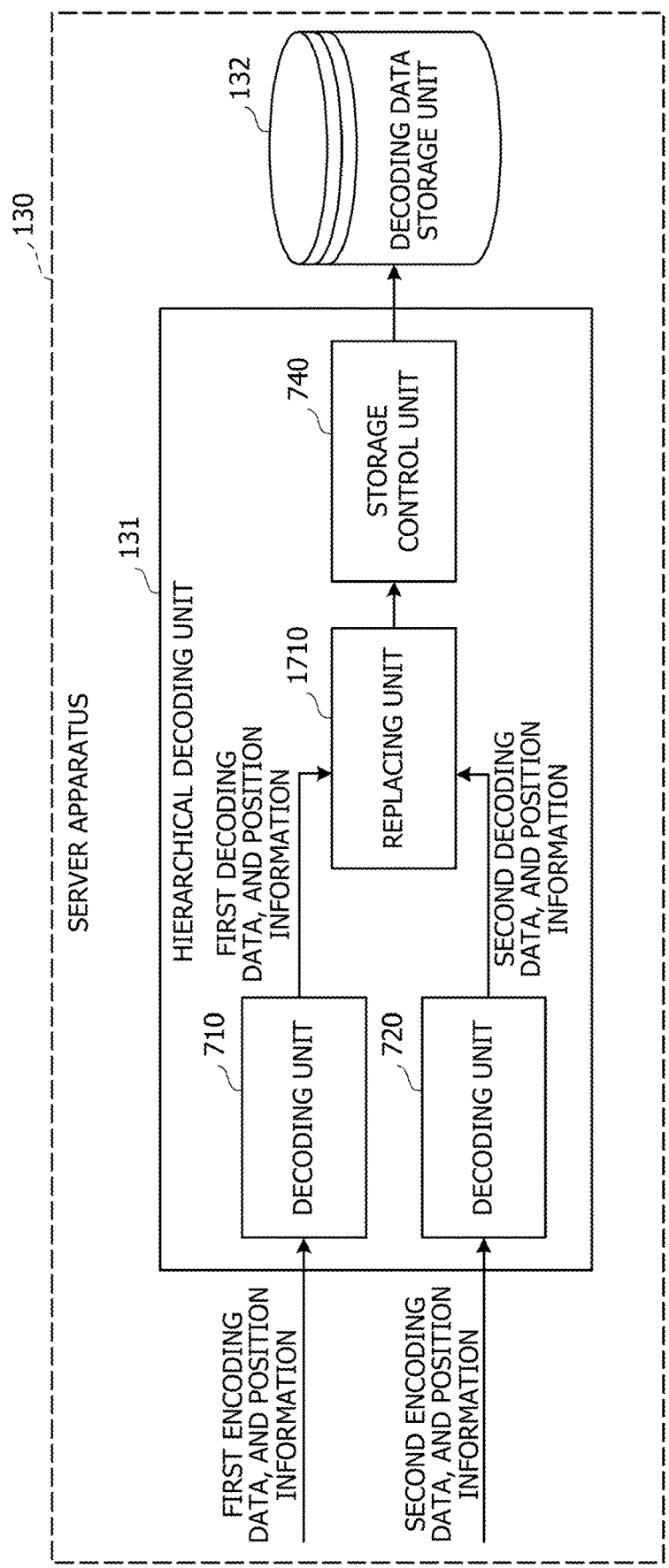
FIG. 17 is a second diagram illustrating the example of the functional configuration of the hierarchical decoding unit of the server apparatus.

Next, details of a functional configuration of the hierarchical decoding unit 131 in the server apparatus 130 according to the third embodiment will be described. FIG. 17 is a second diagram illustrating the example of the functional configuration of the hierarchical decoding unit of the server apparatus. As illustrated in FIG. 17, the hierarchical decoding unit 131 includes the decoding unit 710, the decoding unit 720, a replacing unit 1710, and the storage control unit 740.

The decoding unit 710 receives first encoding data transmitted from the image processing apparatus 120 together with position information. The decoding unit 710 decodes the first encoding data, and notifies the replacing unit 1710 of first decoding data together with the position information.

The decoding unit 720 receives second encoding data transmitted from the image processing apparatus 120 together with position information. The decoding unit 720 decodes the second encoding data, and notifies the replacing unit 1710 of second decoding data together with the position information.

The replacing unit 1710 replaces a target region specified by the position information in the first decoding data notified from the decoding unit 710 with a target region specified by the position information in the second decoding data notified from the decoding unit 720, and generates decoding data after the replacement.

The storage control unit 740 stores the generated decoding data after the replacement in the decoding data storage unit 132.

<Specific Example of Process of Replacing Unit>

Figure 18:
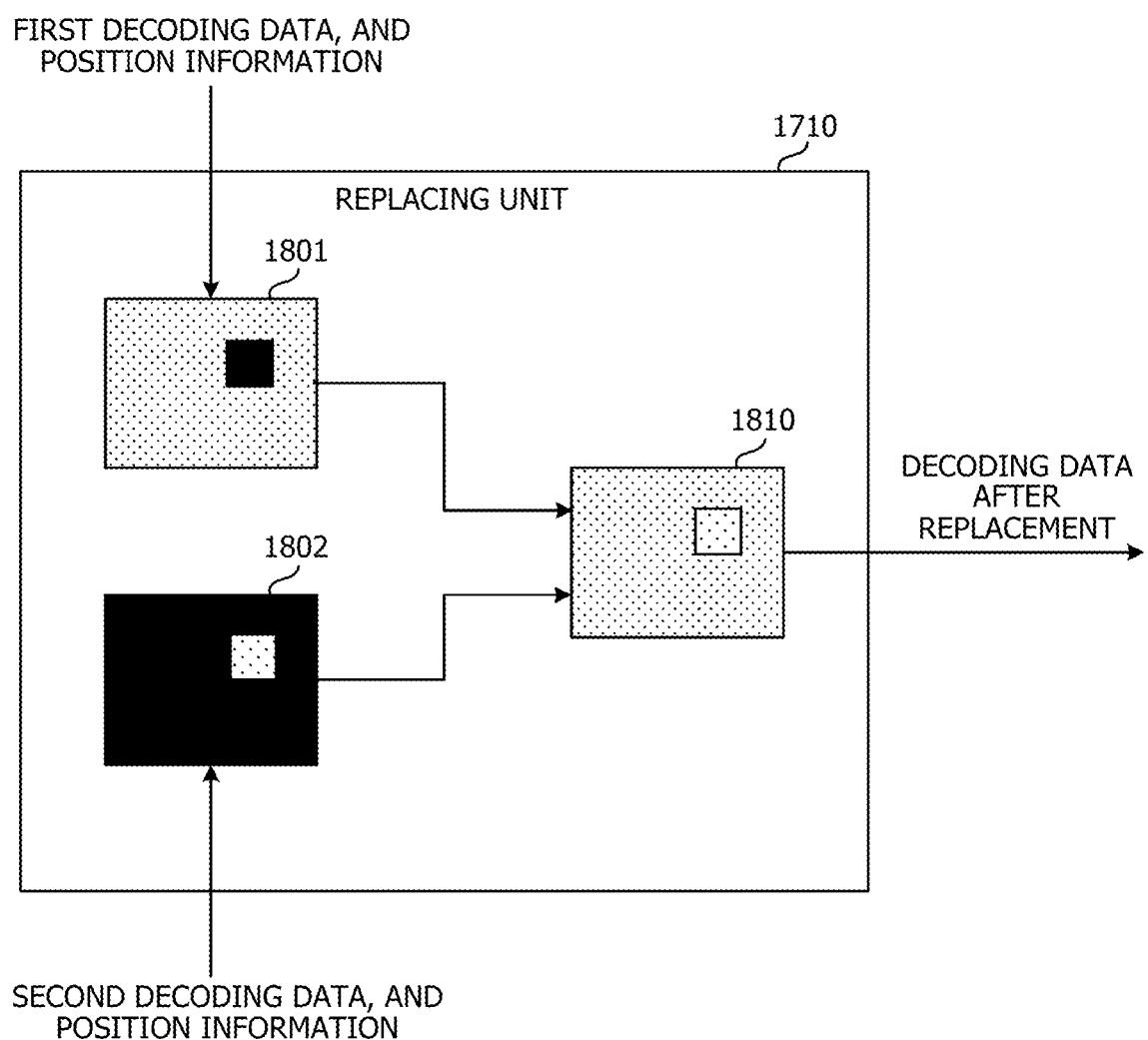
FIG. 18 is a diagram illustrating a specific example of a process of a replacing unit.

Next, a specific example of a process of the replacing unit 1710 is described. FIG. 18 is a diagram illustrating the specific example of the process of the replacing unit. In FIG. 18, first decoding data 1801 is decoding data generated by the decoding unit 710 decoding first encoding data. Second decoding data 1802 is decoding data generated by the decoding unit 720 decoding second encoding data.

As illustrated in FIG. 18, the replacing unit 1710 generates post-replacement decoding data 1810 by replacing a target region specified by position information in the first decoding data 1801 with a target region specified by position information in the second decoding data 1802.

<Flow of Hierarchical Decoding Process>

Figure 19:
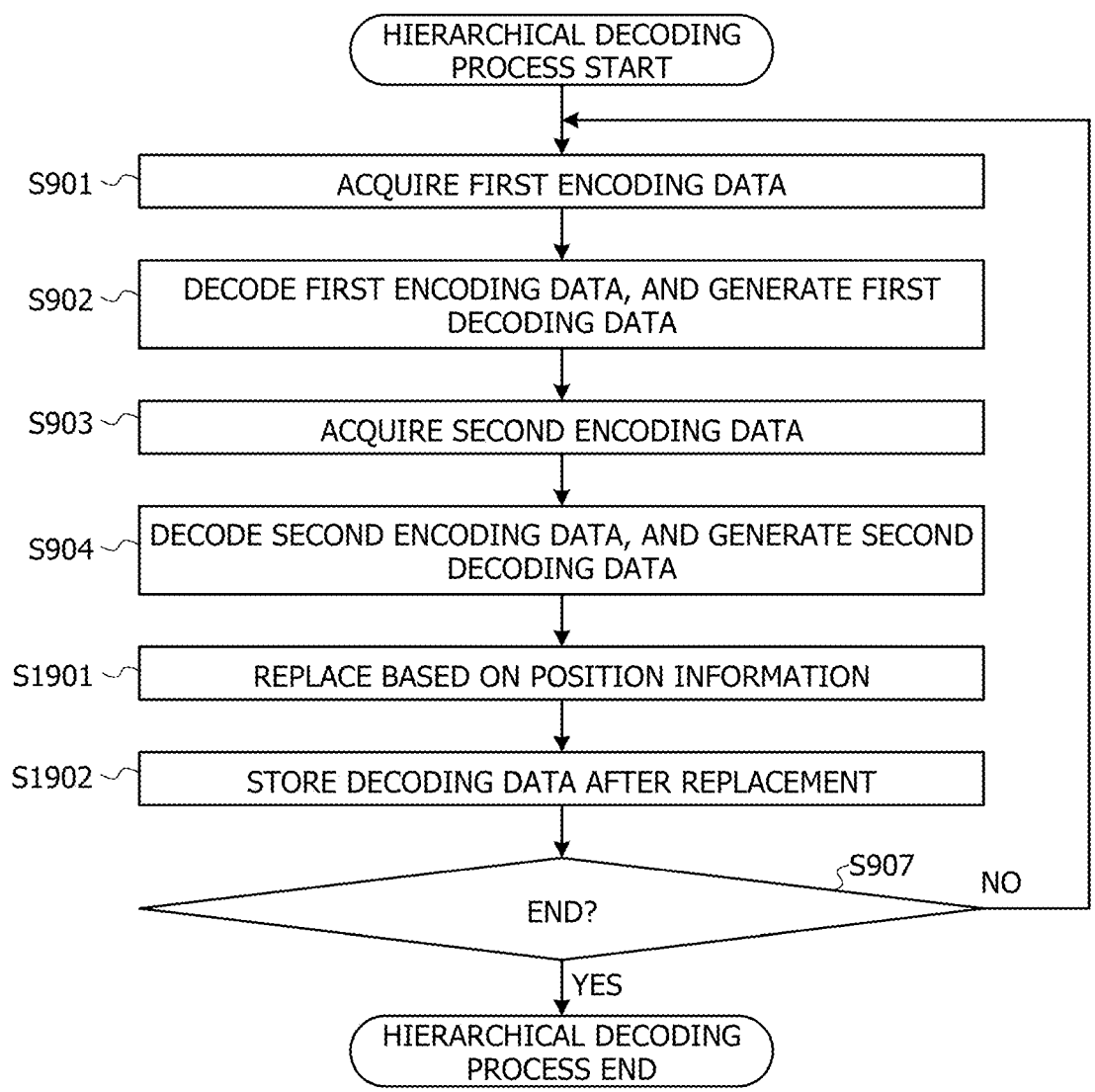
FIG. 19 is a second flowchart illustrating the flow of the hierarchical decoding process.

Next, a flow of a hierarchical decoding process by the hierarchical decoding unit 131 of the server apparatus 130 according to the third embodiment will be described. FIG. 19 is a second flowchart illustrating the flow of the hierarchical decoding process. FIG. 19 is different from the first flowchart described with reference to FIG. 9 in that steps S1901 and S1902 are provided.

At step S1901, the hierarchical decoding unit 131 replaces a target region specified by position information in first decoding data obtained by decoding first encoding data with a target region specified by position information in second decoding data obtained by decoding second encoding data.

At step S1902, the hierarchical decoding unit 131 stores the decoding data after the replacement in the decoding data storage unit 132.

As is clearly understood from the above description, the image processing apparatus 120 according to the third embodiment encodes second invalidated image data obtained by invalidating a region other than a target region at a limit compression rate. The image processing apparatus 120 according to the third embodiment encodes first invalidated image data obtained by invalidating the target region at a compression rate higher than the limit compression rate.

Therefore, with the third embodiment, the image processing apparatus 120 may improve an image quality of the region other than the target region, as compared with the related art. With the third embodiment, it is possible to reduce the amount of calculation desirable for decoding the first encoding data.

For example, with the third embodiment, even in a case where it is not possible to set a different compression rate for each region, it is possible to generate decoding data with high convenience, and it is possible to reduce the amount of calculation desirable for decoding.

Fourth Embodiment

Although, in the third embodiment described above, the target region detection unit is disposed and the target region detection unit detects a region desirable for recognizing a recognition target in image data to output position information, the position information output function is not limited to being realized by the target region detection unit.

For example, when the compression rate determination unit determines a limit compression rate, the position information may be output by detecting a target region from decoding data. Hereinafter, a fourth embodiment will be described by focusing on a difference from the third embodiment described above.

<Functional Configuration of Hierarchical Encoding Unit of Image Processing Apparatus>

Figure 20:
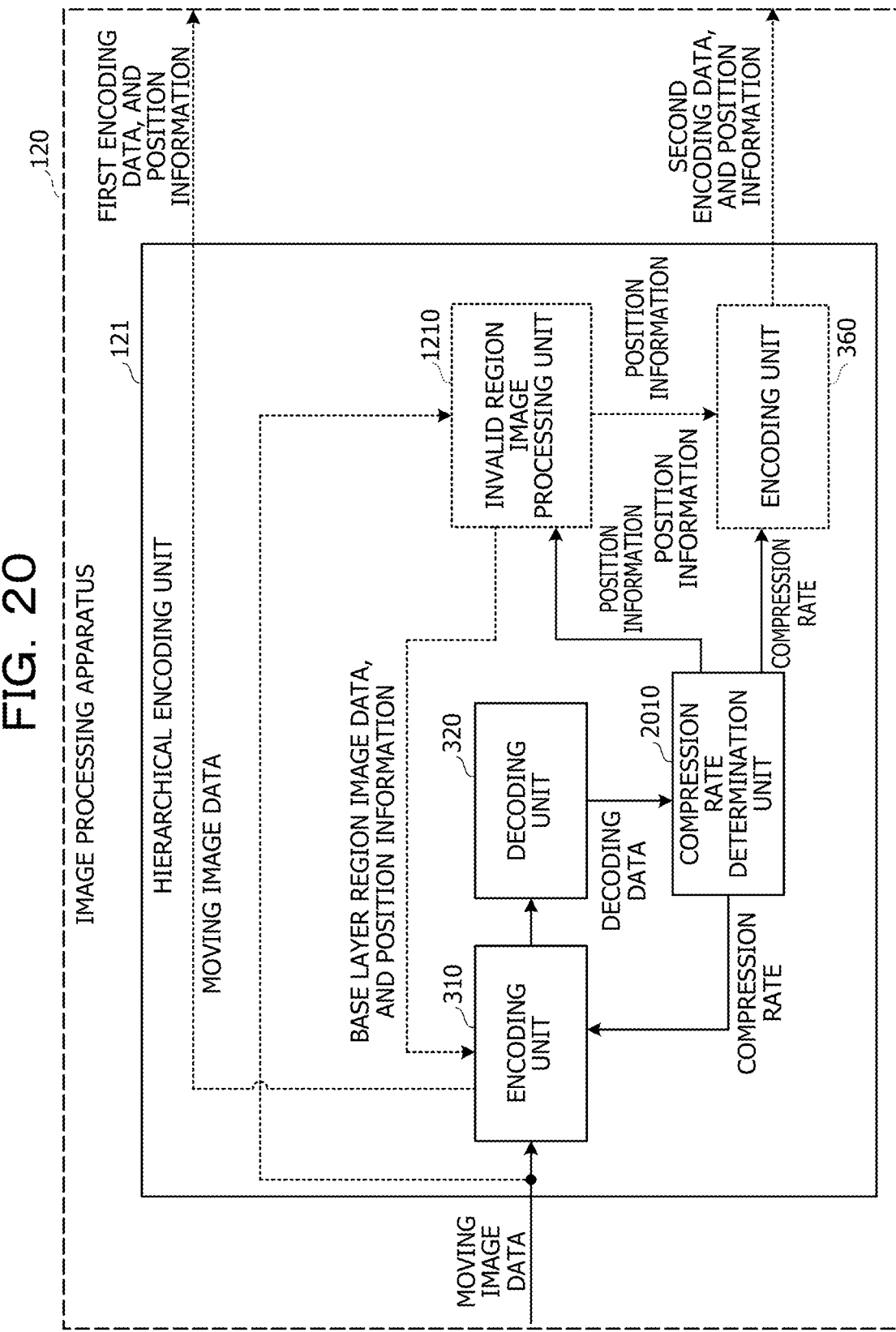
FIG. 20 is a seventh diagram illustrating the example of the functional configuration of the hierarchical encoding unit of the image processing apparatus.
Figure 21:
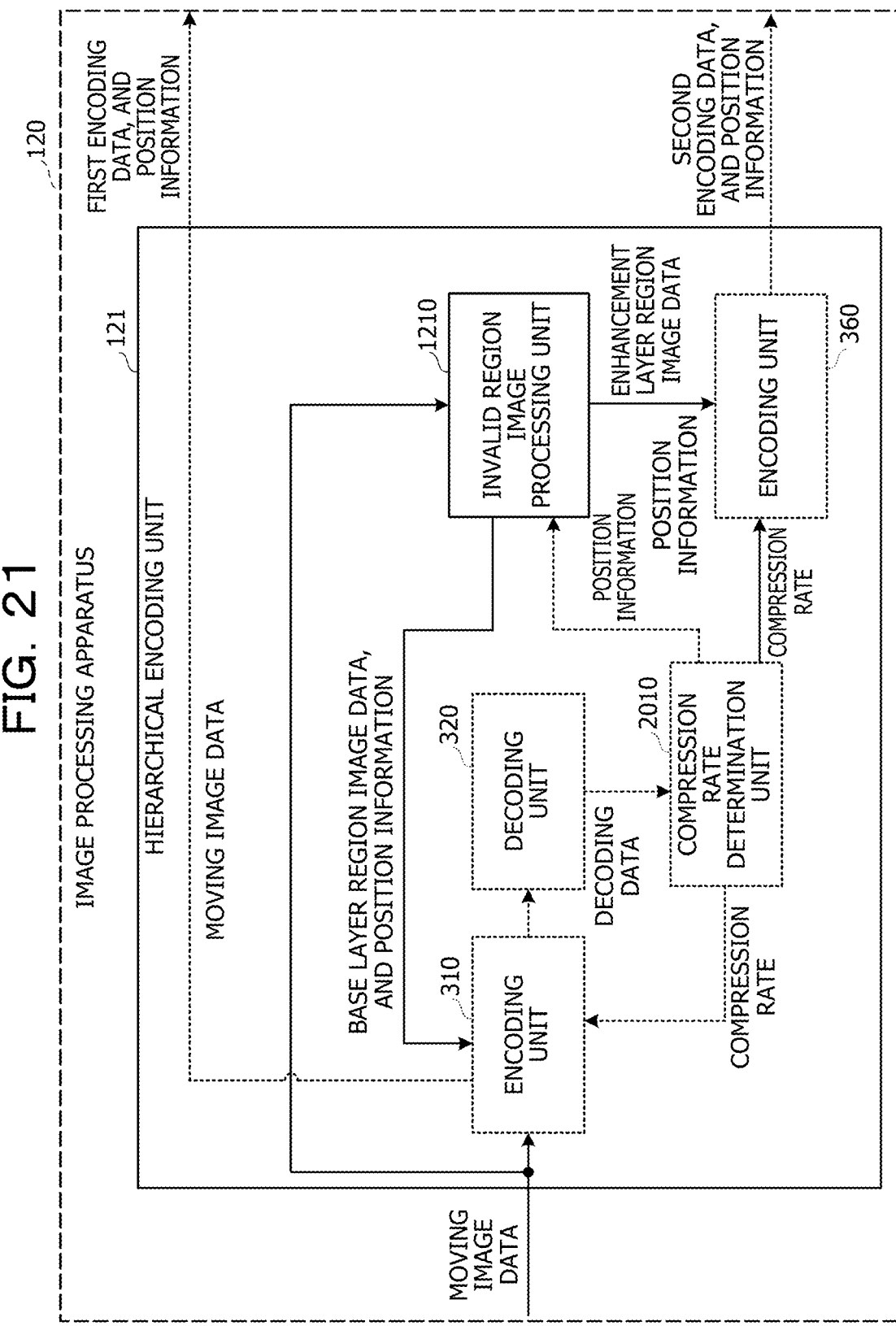
FIG. 21 is an eighth diagram illustrating the example of the functional configuration of the hierarchical encoding unit of the image processing apparatus.

First, a functional configuration of the hierarchical encoding unit 121 of the image processing apparatus 120 according to the fourth embodiment will be described with reference to FIGS. 20 and 21. FIG. 20 and FIG. 21 are seventh and eighth diagrams illustrating an example of the functional configuration of the hierarchical encoding unit of the image processing apparatus. A difference from the functional configuration described with reference to FIG. 12 includes that the target region detection unit 340 is not included and that a function of a compression rate determination unit 2010 is different from the function of the compression rate determination unit 330.

First, with reference to FIG. 20, a function of each unit until a limit compression rate to be used when image data for one frame is encoded is determined and position information is output will be described.

The compression rate determination unit 2010 performs a recognition process by AI on decoding data notified by the decoding unit 320, and determines whether or not a recognition target included in the decoding data may be recognized. When it is determined that the recognition target may be recognized, the compression rate determination unit 2010 increases a compression rate by a predetermined step width and notifies the encoding unit 310 of the increased compression rate.

In a case where it is determined that the recognition target may not be recognized, the compression rate determination unit 2010 determines a compression rate previously notified to the encoding unit 310 as a limit compression rate. The compression rate determination unit 2010 notifies the encoding unit 310 and the encoding unit 360 of the determined limit compression rate.

The compression rate determination unit 2010 detects, as a target region, a region desirable for recognizing the recognition target in the decoding data when performing encoding at the limit compression rate. The compression rate determination unit 2010 calculates a position of the detected target region in the decoding data, and notifies the invalid region image processing unit 1210 of the position information.

Subsequently, a function of each unit until image data to be encoded by each of the encoding unit 310 and the encoding unit 360 is generated will be described with reference to FIG. 21.

The invalid region image processing unit 1210 generates enhancement layer region image data (second invalidated image data) by invalidating a region other than the target region specified by the notified position information, in the image data for one frame acquired from the moving image data. The invalid region image processing unit 1210 notifies the encoding unit 360 of the generated enhancement layer region image data (second invalidated image data) together with position information.

The invalid region image processing unit 1210 generates base layer region image data (first invalidated image data) by invalidating the target region specified by the notified position information, in the image data for one frame acquired from the moving image data. The invalid region image processing unit 1210 notifies the encoding unit 310 of the generated base layer region image data (first invalidated image data) together with position information.

<Flow of Hierarchical Encoding Process>

Next, a flow of a hierarchical encoding process by the hierarchical encoding unit 121 of the image processing apparatus 120 according to the fourth embodiment will be described. FIG. 22 is a fourth flowchart illustrating the flow of the hierarchical encoding process. FIG. 22 is different from the third flowchart described with reference to FIG. 16 in that step S2201 is provided.

At step S2201, the hierarchical encoding unit 121 detects a target region desirable for recognizing a recognition target in the decoding data when performing encoding at the limit compression rate, and outputs position information by calculating a position of the detected target region in the decoding data.

As is clearly understood from the above description, the image processing apparatus 120 according to the fourth embodiment outputs the position information by detecting, as the target region, the region desirable for recognizing the recognition target in the decoding data when determining the limit compression rate. Therefore, with the fourth embodiment, the same effects as those of the third embodiment described above may be obtained.

Other Embodiments

The first and second embodiments described above are described as the example in which the invalid region image processing unit is described as a unit that generates difference data by calculating a difference between first invalidated image data and second invalidated image data. Meanwhile, a method of generating the difference data is not limited to this, and for example, the difference data may be generated by calculating a difference between the first invalidated image data and the second invalidated image data, and then adding an offset value to the difference. Therefore, the difference data may be made non-negative.

With the first and second embodiments described above, the example in which the hierarchical encoding unit 121 generates two hierarchical levels of encoding data by using a case where one recognition target is included in image data is described. Meanwhile, a method of generating the encoding data is not limited to this. For example, in a case where n recognition targets are included in the image data and limit compression rates of the respective recognition targets are different from each other, pieces of encoding data having (n+1) hierarchical levels are generated.

The third and fourth embodiments described above are described as the example in which the encoding unit 310 transmits first encoding data together with position information and the encoding unit 360 transmits second encoding data together with position information. Meanwhile, the position information may be transmitted together with any one of the encoding data by the encoding unit 310 or the encoding unit 360.

The third and fourth embodiments described above are described as the example in which the invalid region image processing unit invalidates a target region specified by the position information when generating base layer region image data (first invalidated image data). The invalid region image processing unit is described as a unit that invalidates a region other than the target region specified by the position information when generating enhancement layer region image data (second invalidated image data).

Meanwhile, a method of generating the first invalidated image data and the second invalidated image data is not limited to this, and for example, the first invalidated image data may be generated by invalidating a region smaller than the target region specified by the position information. Alternatively, the second invalidated image data may be generated by invalidating a region other than a region larger than the target region specified by the position information. For example, when the replacing unit performs replacement, a margin region may be provided such that first decoding data and second decoding data overlap with each other at a boundary portion of the target region. For example, a filtering process may be performed on the overlapping margin region. Although the filtering process in this case includes, for example, a process of averaging a pixel value of the first decoding data and a pixel value of the second decoding data, the filtering process is not limited to the process.

With the third and fourth embodiments described above, the case where the replacing unit performs replacement by using position information transmitted and received between the hierarchical encoding unit and the hierarchical decoding unit is described. Meanwhile, a process equivalent to the replacement by the replacing unit may be performed without transmitting and receiving the position information. For example, the hierarchical encoding unit generates first invalidated image data in which a pixel value of the target region of the first decoding data is set to 0, and generates second invalidated image data in which a pixel value of a region other than the target region of the second decoding data is set to 0. The hierarchical decoding unit searches for a position at which, all of each pixel value of a region other than the target region of the first decoding data and each pixel value of the target region of the second decoding data are not changed when each pixel value of the first decoding data and each pixel value of the second decoding data are added. Therefore, it is possible to appropriately perform position alignment on the first decoding data and the second decoding data by the hierarchical decoding unit, and to realize a process equivalent to the replacement.

Each of the embodiments described above is described as the example in which the hierarchical decoding unit 131 of the server apparatus 130 stores decoding data after addition or decoding data after replacement in the decoding data storage unit 132. Meanwhile, the function of the hierarchical decoding unit 131 is not limited to this, and for example, in order to reduce a difference in image quality between the target region and the region other than the target region, a filtering process or the like may be performed on the decoding data, and then the decoding data may be stored.

Each of the embodiments described above is described as the example in which the image processing apparatus 120 functions as the hierarchical encoding unit 121 and the server apparatus 130 functions as the hierarchical decoding unit 131. Meanwhile, the image processing apparatus 120 may have a part of the function included in the hierarchical decoding unit 131, in addition to the hierarchical encoding unit 121. Alternatively, the server apparatus 130 may have a part of the function included in the hierarchical encoding unit 121, in addition to the hierarchical decoding unit 131.

Although the imaging apparatus 110 and the image processing apparatus 120 are described as separate apparatuses in each of the embodiments described above, the imaging apparatus 110 and the image processing apparatus 120 may be integrated to be a single apparatus. Alternatively, the imaging apparatus 110 may have a part of the function included in the hierarchical encoding unit 121 of the image processing apparatus 120.

The recognition process by AI described in each of the embodiments described above may include an analysis process for obtaining a result based on analysis by a calculator or the like, in addition to a deep learning process.

In each of the embodiments described above, the process used when the target region detection unit 340 detects a target region desirable for recognizing a recognition target and the process used when the compression rate determination unit 330 determines whether or not the recognition target may be recognized may be the same process or different processes.

Although, in each of the embodiments described above, the compression rate determination unit 330 determines a limit compression rate by increasing a compression rate by a predetermined step width, the method of determining the limit compression rate is not limited to this. For example, the compression rate determination unit 330 may determine the limit compression rate by analyzing a recognition state or a recognition step by AI.

In each of the embodiments described above, each of the compression rate used when the target region detection unit 340 detects the target region desirable for recognizing the recognition target and the limit compression rate determined by the compression rate determination unit 330 may be a compression rate in accordance with an intended use of decoding data. For example,
- as a limit compression rate determined by the compression rate determination unit 330, a compression rate at which a recognition target may be recognized may be used, and
- as a compression rate used when the target region detection unit 340 detects a target region desirable for recognizing a recognition target, a compression rate appropriate for further analyzing the recognition target in detail or with high accuracy may be used.

The method of determining a compression rate when first encoding data and second encoding data are generated, which is described in each of the embodiments described above, is an example, and the compression rate may be determined by another determination method. For example, one or both of a compression rate for generating the first encoding data and a compression rate for generating the second encoding data may be determined based on information on an analysis result or an analysis process of AI, and the like.

The present disclosure is not limited to the configurations illustrated herein but may include configurations such as a combination of any of the configurations exemplified in the embodiments described above with other elements. These aspects may be modified without departing from the gist of the present disclosure and appropriately set in accordance with application modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding apparatus comprising:
a memory; and
a processor coupled to the memory and configured to:
determine, based on a result of a recognition process by AI, a target region desirable for recognizing a recognition target in image data and a limit compression rate at which the recognition target is recognizable;
encode all regions of the image data at the limit compression rate, and transmits the encoded image data;
generate first invalidated image data by invalidating a region other than the target region in the image data, and second invalidated image data by invalidating the region other than the target region in decoding data obtained by encoding the image data at the limit compression rate, and decoding the encoded image data; and
encode difference data between the first invalidated image data and the second invalidated image data at a predetermined compression rate, and transmits the encoded difference data.

2. The encoding apparatus according to claim 1, wherein the processor determines the limit compression rate based on a recognition process result acquired by performing the recognition process by the AI on decoding data generated by decoding the encoded image data each time a compression rate is increased by a predetermined step width.

3. The encoding apparatus according to claim 1, wherein the difference data is generated by calculating a difference between the first invalidated image data and the second invalidated image data, and adding an offset value to the difference to make the difference data non-negative.

4. A decoding apparatus that communicates with the encoding apparatus according to claim 1, the decoding apparatus comprising:
a memory; and
a processor coupled to the memory and configured to:
decode the image data which is encoded;
decode the difference data which is encoded; and
add the decoded difference data to the decoded image data.

5. The decoding apparatus according to claim 4, wherein a filtering process is performed on a boundary portion between the target region and the region other than the target region in the image data after the addition to which the decoded difference data is added.

6. An encoding method comprising:
determining, based on a result of a recognition process by AI, a target region desirable for recognizing a recognition target in image data and a limit compression rate at which the recognition target is recognizable;
encoding all regions of the image data at the limit compression rate, and transmits the encoded image data;
generating first invalidated image data by invalidating a region other than the target region in the image data, and second invalidated image data by invalidating the region other than the target region in decoding data obtained by encoding the image data at the limit compression rate, and decoding the encoded image data; and
encoding difference data between the first invalidated image data and the second invalidated image data at a predetermined compression rate, and transmits the encoded difference data.

7. A decoding method comprising:
decode the image data which is encoded by the encoding method according to claim 6;
decode the difference data which is encoded by the encoding method according to claim 6; and
add the decoded difference data to the decoded image data.

* * * * *